United States Patent
Watts et al.

[11] Patent Number: 5,940,623
[45] Date of Patent: Aug. 17, 1999

[54] SOFTWARE LOADING SYSTEM FOR A COIN WRAPPER

[75] Inventors: Gary P. Watts, Buffalo Grove; Richard A. Mazur, Naperville; John F. Weggesser, Lake in the Hills, all of Ill.

[73] Assignee: Cummins-Allison Corp., Mt. Prospect, Ill.

[21] Appl. No.: 08/905,504

[22] Filed: Aug. 1, 1997

[51] Int. Cl.[6] .................................................. G06F 9/445
[52] U.S. Cl. ........................ 395/712; 453/31; 364/280; 705/25
[58] Field of Search ................... 364/478.01, 478.07, 364/479.01, 479.02, 280; 395/712, 651–653; 705/25; 53/212; 453/31

[56] References Cited

U.S. PATENT DOCUMENTS

| | | | |
|---|---|---|---|
| D. 369,984 | 5/1996 | Larsen | D10/97 |
| 2,669,998 | 2/1954 | Buchholz | 133/8 |
| 2,750,949 | 6/1956 | Kulo et al. | 133/8 |
| 2,835,260 | 5/1958 | Buchholz | 133/8 |
| 3,246,295 | 4/1966 | DeClaris et al. | 382/56 |

(List continued on next page.)

FOREIGN PATENT DOCUMENTS

| | | |
|---|---|---|
| 0 077 464 | 4/1983 | European Pat. Off. . |
| 0 101 115 | 2/1984 | European Pat. Off. . |
| 0 109 743 | 5/1984 | European Pat. Off. . |
| 0 185 200 | 6/1986 | European Pat. Off. . |
| 0 325 364 | 7/1989 | European Pat. Off. . |

(List continued on next page.)

OTHER PUBLICATIONS

"Toshiba Fitness Sorter CF–400 Series", estimated 1989 or earlier, 6 pages.
Mosler Inc. brochure "The Mosler/Toshiba CF–420". 1989.
JetScan Currency Scanner/Counter, Model 4060, Operator's Manual by Cummins–Allison (Aug. 1991).
Sale of Jet Scan Currency Scanner/Counter, Model 4060 (Aug. 1991).
JetScan Currency Scanner/Counter, Model 4061, Operating Instructions by Cummins–Allison Corp. (Apr. 20, 1993).
Sale of JetScan Currency Scanner/Counter, Model 4061 (Apr. 20, 1993).
JetScan Currency Scanner/Counter, Model 4062, Operating Instructions by Cummins–Allison Corp. (Nov. 28, 1994).
Sale of JetScan Currency Scanner/Counter, Model 4062 (Nov. 28, 1994).

(List continued on next page.)

*Primary Examiner*—William Grant
*Assistant Examiner*—Chad Rapp
*Attorney, Agent, or Firm*—Arnold White & Durkee

[57] ABSTRACT

An apparatus and method for loading software changes into a processor-based coin wrapping machine. In one embodiment, a flash card having a memory remotely programmed with a second software code is adapted to be removably electrically coupled to the system controller of the coin wrapping machine. Insertion of the flash card causes the initial code in the resident memory of the machine to become erased and replaced with the second software code. The flash card may thereafter be removed from the machine and used to load software changes into other machines. In an alternative embodiment, the flash card may remain electrically coupled to the coin wrapping machine. In this embodiment, insertion of the flash card causes the machine to execute the second software code, but the initial code is not erased or replaced. Upon removal of the flash card, the machine does not retain the second software code but will revert to execution of the initial code. In either embodiment, remote programming of the flash card with the second software code may be achieved by electrically coupling the flash card to a first coin wrapping machine having a resident memory containing the second software code, causing the second software code to be copied from the resident memory of the first coin wrapping machine to the flash card memory.

14 Claims, 32 Drawing Sheets

U.S. PATENT DOCUMENTS

| | | | |
|---|---|---|---|
| 3,280,974 | 10/1966 | Riddle et al. | 209/111.8 |
| 3,480,785 | 11/1969 | Aufderheide | 250/219 |
| 3,496,370 | 2/1970 | Haville et al. | 250/219 |
| 3,509,535 | 4/1970 | Berube | 340/149 |
| 3,612,835 | 10/1971 | Andrews et al. | 235/61.11 D |
| 3,618,765 | 11/1971 | Cooper et al. | 209/122 |
| 3,679,314 | 7/1972 | Mustert | 356/71 |
| 3,715,031 | 2/1973 | Okkonen | 209/75 |
| 3,764,899 | 10/1973 | Peterson | 324/61 R |
| 3,778,628 | 12/1973 | Novak et al. | 250/556 |
| 3,800,078 | 3/1974 | Cochran et al. | 178/7.1 |
| 3,806,710 | 4/1974 | Shigemori et al. | 235/92 |
| 3,815,021 | 6/1974 | Kerr | 324/61 R |
| 3,842,281 | 10/1974 | Goodrich | 250/461 |
| 3,870,629 | 3/1975 | Carter et al. | 209/111.8 |
| 3,906,449 | 9/1975 | Marchak | 340/149 R |
| 3,976,198 | 8/1976 | Carnes et al. | 209/111.7 T |
| 4,041,456 | 8/1977 | Ott et al. | 340/146.3 R |
| 4,096,991 | 6/1978 | Iguchi | 235/419 |
| 4,114,804 | 9/1978 | Jones et al. | 235/476 |
| 4,147,430 | 4/1979 | Gorgone et al. | 356/51 |
| 4,179,685 | 12/1979 | O'Maley | 340/146.3 H |
| 4,205,780 | 6/1980 | Burns et al. | 235/454 |
| 4,250,806 | 2/1981 | Boyson et al. | 101/2 |
| 4,255,651 | 3/1981 | Phillips | 235/92 |
| 4,264,808 | 4/1981 | Owens et al. | 235/379 |
| 4,277,774 | 7/1981 | Fujii et al. | 340/146.3 |
| 4,283,708 | 8/1981 | Lee | 340/146.3 Z |
| 4,288,781 | 9/1981 | Sellner et al. | 340/146.3 Q |
| 4,302,781 | 11/1981 | Ikeda et al. | 358/486 |
| 4,310,885 | 1/1982 | Azcua et al. | 364/405 |
| 4,311,914 | 1/1982 | Huber | 250/556 |
| 4,313,598 | 2/1982 | DiBlasio | 271/124 |
| 4,334,619 | 6/1982 | Horino et al. | 209/551 |
| 4,337,864 | 7/1982 | McLean | 209/534 |
| 4,348,656 | 9/1982 | Gorgone et al. | 340/146.3 R |
| 4,349,111 | 9/1982 | Shah et al. | 209/534 |
| 4,352,988 | 10/1982 | Ishida | 250/559 |
| 4,355,300 | 10/1982 | Weber | 340/146.3 C |
| 4,355,369 | 10/1982 | Garvin | 364/900 |
| 4,356,473 | 10/1982 | Freudenthal | 340/146.3 H |
| 4,360,034 | 11/1982 | Davila et al. | 133/3 |
| 4,365,700 | 12/1982 | Arimato et al. | 194/2 |
| 4,381,447 | 4/1983 | Horvath et al. | 250/223 |
| 4,386,432 | 5/1983 | Nakamura et al. | 250/223 |
| 4,396,902 | 8/1983 | Warthan et al. | 382/64 |
| 4,416,299 | 11/1983 | Bergman | 133/1 R |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,480,177 | 10/1984 | Allen | 235/379 |
| 4,487,306 | 12/1984 | Nao et al. | 194/4 |
| 4,490,846 | 12/1984 | Ishida et al. | 382/7 |
| 4,513,439 | 4/1985 | Gorgone et al. | 382/7 |
| 4,530,067 | 7/1985 | Dorr | 364/900 |
| 4,538,719 | 9/1985 | Gray et al. | 194/100 A |
| 4,539,702 | 9/1985 | Oka | 382/7 |
| 4,542,829 | 9/1985 | Emery et al. | 209/534 |
| 4,543,969 | 10/1985 | Rasmussen | 133/3 |
| 4,544,266 | 10/1985 | Antes | 356/71 |
| 4,547,896 | 10/1985 | Ohtombe et al. | 382/7 |
| 4,553,222 | 11/1985 | Kurland et al. | 364/900 |
| 4,553,846 | 11/1985 | Hilton et al. | 356/429 |
| 4,556,140 | 12/1985 | Okada | 194/4 |
| 4,558,224 | 12/1985 | Gober | 250/460.1 |
| 4,559,451 | 12/1985 | Curl | 250/560 |
| 4,563,771 | 1/1986 | Gorgone et al. | 382/7 |
| 4,567,370 | 1/1986 | Falls | 250/461.1 |
| 4,569,421 | 2/1986 | Sandstedt | 186/39 |
| 4,582,172 | 4/1986 | Takeuchi et al. | 186/38 |
| 4,587,412 | 5/1986 | Apisdorf | 235/449 |
| 4,587,434 | 5/1986 | Roes et al. | 250/556 |
| 4,592,090 | 5/1986 | Curl et al. | 382/7 |
| 4,593,184 | 6/1986 | Bryce | 235/449 |
| 4,594,664 | 6/1986 | Hashimoto | 364/405 |
| 4,611,345 | 9/1986 | Ohnishi et al. | 382/7 |
| 4,617,458 | 10/1986 | Bryce | 235/449 |
| 4,628,194 | 12/1986 | Dobbins et al. | 235/379 |
| 4,645,936 | 2/1987 | Gorgone | 250/556 |
| 4,653,647 | 3/1987 | Hashimoto | 250/556 |
| 4,658,289 | 4/1987 | Nagano et al. | 358/75 |
| 4,676,343 | 6/1987 | Humble et al. | 186/61 |
| 4,677,682 | 6/1987 | Miyagawa et al. | 382/7 |
| 4,678,072 | 7/1987 | Kobayashi et al. | 194/206 |
| 4,681,229 | 7/1987 | Uesaka et al. | 209/534 |
| 4,697,071 | 9/1987 | Hiraoka et al. | 235/379 |
| 4,700,368 | 10/1987 | Munn et al. | 377/8 |
| 4,716,456 | 12/1987 | Hosaka | 358/75 |
| 4,733,308 | 3/1988 | Nakamura et al. | 358/496 |
| 4,735,289 | 4/1988 | Kenyon | 186/37 |
| 4,743,974 | 5/1988 | Lockwood | 358/285 |
| 4,747,492 | 5/1988 | Saito et al. | 209/534 |
| 4,753,625 | 6/1988 | Okada | 453/32 |
| 4,764,976 | 8/1988 | Kallin et al. | 382/65 |
| 4,782,328 | 11/1988 | Denlinger | 340/365 |
| 4,784,274 | 11/1988 | Mori et al. | 209/534 |
| 4,789,345 | 12/1988 | Carter | 439/71 |
| 4,806,709 | 2/1989 | Evans | 178/19 |
| 4,811,004 | 3/1989 | Person et al. | 340/712 |
| 4,820,909 | 4/1989 | Kawauchi et al. | 235/379 |
| 4,821,332 | 4/1989 | Durham | 382/7 |
| 4,823,393 | 4/1989 | Kawakami | 382/7 |
| 4,825,246 | 4/1989 | Fukuchi et al. | 355/4 |
| 4,827,531 | 5/1989 | Milford | 382/7 |
| 4,837,842 | 6/1989 | Holt | 382/26 |
| 4,841,358 | 6/1989 | Kammoto et al. | 358/75 |
| 4,851,616 | 7/1989 | Wales et al. | 178/18 |
| 4,877,230 | 10/1989 | Winkler et al. | 271/3 |
| 4,880,096 | 11/1989 | Validator | 194/206 |
| 4,881,268 | 11/1989 | Uchida et al. | 382/7 |
| 4,883,181 | 11/1989 | Yoshikawa | 209/534 |
| 4,888,812 | 12/1989 | Dinan et al. | 382/7 |
| 4,903,953 | 2/1990 | Winkler et al. | 271/4 |
| 4,905,840 | 3/1990 | Yuge et al. | |
| 4,908,516 | 3/1990 | West | 250/556 |
| 4,928,094 | 5/1990 | Smith | 340/712 |
| 4,931,782 | 6/1990 | Jackson | 340/706 |
| 4,954,697 | 9/1990 | Kokubun et al. | 235/381 |
| 4,970,655 | 11/1990 | Winn et al. | 364/479 |
| 4,973,851 | 11/1990 | Lee | 250/556 |
| 4,980,543 | 12/1990 | Hara et al. | 209/534 |
| 4,984,280 | 1/1991 | Abe | 382/7 |
| 4,992,860 | 2/1991 | Hamaguchi et al. | 358/75 |
| 4,996,604 | 2/1991 | Ogawa et al. | 358/486 |
| 5,020,787 | 6/1991 | Arikawa | 271/3 |
| 5,023,782 | 6/1991 | Lutz et al. | 364/405 |
| 5,027,415 | 6/1991 | Hara et al. | 382/7 |
| 5,047,871 | 9/1991 | Meyer et al. | 358/486 |
| 5,054,621 | 10/1991 | Murphy et al. | 209/534 |
| 5,055,834 | 10/1991 | Chiba | 340/825 |
| 5,063,599 | 11/1991 | Concannon et al. | 382/7 |
| 5,066,292 | 11/1991 | Wu et al. | 357/23.5 |
| 5,068,519 | 11/1991 | Bryce | 235/449 |
| 5,091,961 | 2/1992 | Baus, Jr. | 382/7 |
| 5,105,601 | 4/1992 | Horiguchi et al. | 53/465 |
| 5,114,381 | 5/1992 | Ueda et al. | 453/57 |
| 5,122,754 | 6/1992 | Gotaas | 324/676 |
| 5,134,663 | 7/1992 | Kozlowski | 382/7 |
| 5,146,512 | 9/1992 | Weideman et al. | 382/30 |
| 5,151,607 | 9/1992 | Crane | 250/556 |
| 5,159,548 | 10/1992 | Caslavka | 364/408 |

| | | | |
|---|---|---|---|
| 5,163,672 | 11/1992 | Mennie | 271/187 |
| 5,163,868 | 11/1992 | Adams et al. | 453/11 |
| 5,167,313 | 12/1992 | Dobbin et al. | 194/317 |
| 5,172,907 | 12/1992 | Kalisiak | 271/227 |
| 5,183,142 | 2/1993 | Latchinian et al. | 194/206 |
| 5,184,115 | 2/1993 | Black et al. | 340/708 |
| 5,184,709 | 2/1993 | Nishiumi et al. | 194/318 |
| 5,186,334 | 2/1993 | Fukudome et al. | 209/534 |
| 5,187,750 | 2/1993 | Behera | 382/7 |
| 5,193,121 | 3/1993 | Elischer et al. | 382/7 |
| 5,198,976 | 3/1993 | Form et al. | 364/410 |
| 5,199,543 | 4/1993 | Kamagami et al. | 194/207 |
| 5,201,395 | 4/1993 | Takezawa et al. | 194/206 |
| 5,207,788 | 5/1993 | Geib et al. | 271/122 |
| 5,220,395 | 6/1993 | Yamashita et al. | 355/313 |
| 5,231,381 | 7/1993 | Duwaer | 340/712 |
| 5,236,072 | 8/1993 | Cargill | 194/207 |
| 5,237,158 | 8/1993 | Kern et al. | 235/379 |
| 5,239,593 | 8/1993 | Wittner et al. | 382/14 |
| 5,240,116 | 8/1993 | Stevens et al. | 209/534 |
| 5,256,080 | 10/1993 | Bright | 439/342 |
| 5,261,518 | 11/1993 | Bryce | 194/206 |
| 5,295,196 | 3/1994 | Raterman et al. | 382/135 |
| 5,297,030 | 3/1994 | Vassigh et al. | 364/405 |
| 5,299,977 | 4/1994 | Mazur et al. | 452/10 |
| 5,304,813 | 4/1994 | DeMan | 250/556 |
| 5,308,992 | 5/1994 | Crane et al. | 250/556 |
| 5,309,515 | 5/1994 | Troung et al. | 382/7 |
| 5,317,140 | 5/1994 | Dunthorn | 250/221 |
| 5,321,238 | 6/1994 | Kamata et al. | 235/379 |
| 5,335,292 | 8/1994 | Lovelady et al. | 382/17 |
| 5,341,408 | 8/1994 | Melcher et al. | 377/8 |
| 5,342,165 | 8/1994 | Graef et al. | 414/788.9 |
| 5,342,213 | 8/1994 | Kobayashi | 439/268 |
| 5,363,949 | 11/1994 | Matsubayashi | 194/206 |
| 5,367,577 | 11/1994 | Gotaas | 382/7 |
| 5,371,345 | 12/1994 | LeStrange et al. | 235/380 |
| 5,379,344 | 1/1995 | Larsson et al. | 380/23 |
| 5,381,019 | 1/1995 | Sato | 250/556 |
| 5,397,003 | 3/1995 | Stevens et al. | 209/534 |
| 5,410,707 | 4/1995 | Bell | 395/652 |
| 5,430,664 | 7/1995 | Cargill et al. | 364/550 |
| 5,430,877 | 7/1995 | Naylor | 395/712 |
| 5,435,777 | 7/1995 | Takatani et al. | 453/31 |
| 5,437,357 | 8/1995 | Ota et al. | 194/206 |
| 5,438,184 | 8/1995 | Roberts et al. | 235/380 |
| 5,444,793 | 8/1995 | Kelland | 382/138 |
| 5,454,727 | 10/1995 | Hsu | 439/263 |
| 5,457,336 | 10/1995 | Fang et al. | 257/322 |
| 5,459,304 | 10/1995 | Eisenmann | 235/380 |
| 5,465,301 | 11/1995 | Jotcham et al. | 380/54 |
| 5,465,821 | 11/1995 | Akioka | 194/207 |
| 5,467,405 | 11/1995 | Raterman et al. | 382/135 |
| 5,467,406 | 11/1995 | Graves et al. | 382/135 |
| 5,478,992 | 12/1995 | Hamada et al. | 235/379 |
| 5,489,217 | 2/1996 | Scheitz et al. | 439/342 |
| 5,493,534 | 2/1996 | Mok | 365/226 |
| 5,530,772 | 6/1996 | Storey | 382/135 |
| 5,542,468 | 8/1996 | Lin | 165/80.3 |
| 5,544,043 | 8/1996 | Miki et al. | 364/406 |
| 5,600,732 | 2/1997 | Ott et al. | 382/112 |
| 5,602,933 | 2/1997 | Blackwell et al. | 382/116 |
| 5,602,936 | 2/1997 | Green et al. | 382/140 |
| 5,603,056 | 2/1997 | Totani | 395/828 |
| 5,615,120 | 3/1997 | Schwartz et al. | 364/464.17 |
| 5,633,949 | 5/1997 | Graves et al. | 382/135 |
| 5,640,463 | 6/1997 | Csulits | 382/135 |
| 5,652,802 | 7/1997 | Graves et al. | 382/135 |
| 5,717,887 | 2/1998 | Leslie | 395/712 X |
| 5,737,610 | 4/1998 | Sandig et al. | 395/712 |
| 5,748,967 | 5/1998 | Nakamura et al. | 395/712 |

FOREIGN PATENT DOCUMENTS

| | | |
|---|---|---|
| 0 338 123 | 10/1989 | European Pat. Off. . |
| 0 342 647 | 11/1989 | European Pat. Off. . |
| 0 583 526 | 8/1992 | European Pat. Off. . |
| 0 583 723 | 8/1993 | European Pat. Off. . |
| 0 578 875 | 1/1994 | European Pat. Off. . |
| 0 690 451 | 1/1996 | European Pat. Off. . |
| 0 700 098 | 3/1996 | European Pat. Off. . |
| 4 310 216 | 9/1994 | Germany . |
| 1 190 996 | 12/1987 | United Kingdom . |
| 2 204 166 | 11/1988 | United Kingdom . |
| 2 217 086 | 10/1989 | United Kingdom . |
| 2 272 762 | 11/1993 | United Kingdom . |
| 2 270 904 | 3/1994 | United Kingdom . |
| WO 90/07165 | 6/1990 | WIPO . |
| WO 91/11778 | 8/1991 | WIPO . |
| WO 92/17394 | 10/1992 | WIPO . |
| WO 93/23824 | 11/1993 | WIPO . |
| WO 95/24691 | 3/1995 | WIPO . |
| WO 96/10800 | 9/1995 | WIPO . |

OTHER PUBLICATIONS

Brochure "DeLaRue Systems, The processing of money and documents;" date: copyr. 1987 (See eg., 3120 Currency Sorting Machine, p. 3).

Brochure by Toyocom, "New Currency Counter with Denomination Recognition, Toyocom NS" (Sep. 26, 1994)(1 page).

Currency System Int'l, Mr. W. Kranister in Conversation with Richard Haycock; dated: estimated 1994; pp. 1–5.

Currency Systems International, CPS 1200; copyr. 1992; 4 pages.

Currency Systems International, Medium Speed Currency Sorting Family, CPS 600 and CPS 900; date: copy. 1994; 4 pages.

Currency Systems International/Currency Processing Systems, CPS 300; date: copyr. 1992; 4 pages.

Despcription of Currency Systems International's CPS 600 and CPS 900 devices; date: estimated 1994.

Description of Toshiba–Mosler CF–420 Device; estimated 1989.

Glory GFB–200/210/220/230, Desk–Top Bank Note Counter; date: estimated before Aug. 9, 1994.

Glory GSA–500 Sortmaster brochure; date: Jan. 14, 1994; 2 pages.

Glory GSA–500 Sortmaster brochure; dated estimated 1994; 4 pages.

Glory Instruction Manual for GFR–100 Currency Reader Counter (Aug. 15, 1995).

Glory UF–ID brochure; date: estimated before Aug. 9, 1994; 2 pages.

Toshiba–Mosler Operators Manual for CF–420 Cash Settlement System; copyr. 1989 (See e.g., pp. 3–10; 4–10; and 5–7); pp. 1 to C–3.

Toyocom Currency Counter, Model NS–100, "Operation Guide (Preliminary)" (Jun. 13, 1995).

| PENNIES | $ .01 | 50 | * | HALVES | $ .50 | 20 | * | 7 | 8 | 9 | BATCH STOP |
| --- | --- | --- | --- | --- | --- | --- | --- | --- | --- | --- | --- |
| NICKELS | $ .05 | 20 | * | SBA | $ 1.00 | 25 | * | 4 | 5 | 6 | _____ |
| NICKELS | $ .05 | 40 | * | TOKEN | $ 1.00 | 20 | * | 1 | 2 | 3 | |
| DIMES | $ .10 | 50 | * | TOKEN | $ 5.00 | 20 | * | | 0 | | |
| QUARTERS | $ .25 | 20 | * | COIN 1 | | | * | | | | |
| QUARTERS | $ .25 | 40 | * | COIN 2 | | | * | | | | WRAPPING 40 QUARTERS |
| | MODE | | | | | | | | | | |
| WRAP | * | | | BAG | * | | | SET-UP * | | RETURN * | |

*FIG. 10*

| PENNIES | $ .01 | 50 | * | HALVES | $ .50 | 20 | * | 7 | 8 | 9 | BATCH STOP |
| --- | --- | --- | --- | --- | --- | --- | --- | --- | --- | --- | --- |
| NICKELS | $ .05 | 20 | * | SBA | $ 1.00 | 25 | * | 4 | 5 | 6 | 50 |
| NICKELS | $ .05 | 40 | * | TOKEN | $ 1.00 | 20 | * | 1 | 2 | 3 | |
| DIMES | $ .10 | 50 | * | TOKEN | $ 5.00 | 20 | * | | 0 | | |
| QUARTERS | $ .25 | 20 | * | COIN 1 | | | * | | | | |
| QUARTERS | $ .25 | 40 | * | COIN 2 | | | * | | | | SETTING UP LOAD COIN AND PAPER |
| | MODE | | | | | | | | | | |
| WRAP | * | | | BAG | * | | | SET-UP * | | RETURN * | |

*FIG. 11*

| | | | | |
|---|---|---|---|---|
| START | * | STOP * | DENOMINATION | 40 QUARTERS |
| CLEAR | * | RESET * | TOTAL PIECES | 0 |
| MENU | * | DENOM * | TOTAL ROLLS | 0 |
| ADD | * | | STATUS | WRAPPING |

*FIG. 12*

| | | | | |
|---|---|---|---|---|
| START | * | STOP * | DENOMINATION | 40 QUARTERS |
| CLEAR | * | RESET * | TOTAL PIECES | 20,040 |
| MENU | * | DENOM * | TOTAL ROLLS | 501 |
| ADD | * | | STATUS | STOPPED |

*FIG. 13*

| | | | | | | | | |
|---|---|---|---|---|---|---|---|---|
| PENNIES | $ .01 50 | * | HALVES | $ .50 20 | * | 7 8 9 | | BATCH STOP |
| NICKELS | $ .05 20 | * | SBA | $ 1.00 25 | * | 4 5 6 | | 1000 |
| NICKELS | $ .05 40 | * | TOKEN | $ 1.00 20 | * | 1 2 3 | | |
| DIMES | $ .10 50 | * | TOKEN | $ 5.00 20 | * | 0 | | |
| QUARTERS | $ .25 20 | * | COIN 1 | | * | | | |
| QUARTERS | $ .25 40 | * | COIN 2 | | * | | | SETTING UP LOAD COIN ATTACH BAG |
| | MODE | | | | | | | |
| WRAP * | BAG | * | | SET-UP * | RETURN | * | | |

FIG. 14

| | | | |
|---|---|---|---|
| START * STOP * | | DENOMINATION | 1000 PENNIES |
| CLEAR * RESET * | | TOTAL PIECES | 0 |
| MENU * DENOM * | | TOTAL BAGS | 0 |
| ADD * | | STATUS | BAGGING |

FIG. 15

| | | | |
|---|---|---|---|
| START * STOP * | | DENOMINATION | 40 QUARTERS |
| CLEAR * RESET * | | TOTAL PIECES | 25,588 |
| MENU * DENOM * | | TOTAL ROLLS | 639 |
| ADD * | | STATUS | COIN JAM IN STACKER |

FIG. 16

| | | | | |
|---|---|---|---|---|
| START | * | STOP * | DENOMINATION | 40 QUARTERS |
| CLEAR | * | RESET * | TOTAL PIECES | 30,000 |
| MENU | * | DENOM * | TOTAL ROLLS | 750 |
| ADD | * | | STATUS | STOPPED |

*FIG. 18*

| | | | | |
|---|---|---|---|---|
| START | * | STOP * | DENOMINATION | 40 QUARTERS |
| CLEAR | * | RESET * | TOTAL PIECES | 30,000 |
| MENU | * | DENOM * | TOTAL ROLLS | 750 |
| ADD | * | | STATUS | CLEARING LOOSE COINS FROM MACHINE |

*FIG. 19*

| START  * | STOP   * | DENOMINATION | 40 QUARTERS |
| CLEAR  * | RESET  * | TOTAL PIECES | 30,000 |
| MENU   * | DENOM  * | TOTAL ROLLS | 750 |
| ADD    * | | STATUS | ARE YOU SURE? YOU ARE CLEARING TOTALS |

*FIG. 20*

| START  * | STOP   * | DENOMINATION | 40 QUARTERS |
| CLEAR  * | RESET  * | TOTAL PIECES | 30,000 |
| MENU   * | DENOM  * | TOTAL ROLLS | 750 |
| ADD    * | | STATUS | COINS CLEARED. PRESS START OR DENOM. |

*FIG. 21*

| | | | |
|---|---|---|---|
| START * STOP * | | DENOMINATION | 40 QUARTERS |
| CLEAR * RESET * | | TOTAL PIECES | 0 |
| MENU * DENOM * | | TOTAL ROLLS | 0 |
| ADD * | | STATUS | TOTALS CLEARED. PRESS START OR DENOM. |

*FIG. 22*

| | | | |
|---|---|---|---|
| START * STOP * | | DENOMINATION | 40 QUARTERS |
| CLEAR * RESET * | | TOTAL PIECES | 30,000 |
| MENU * DENOM * | | TOTAL ROLLS | 750 |
| ADD * | | STATUS | TOTALS ADDED TO MEMORY |

*FIG. 23*

```
       MEMORY RECALL        *

ADJUSTMENTS FOR BETTER WRAP    *

SERVICE DIAGNOSTICS     *
       (Service Only)

PROGRAM CHANGES      *      RETURN
       (Service Only)
```

FIG. 25

```
PENNIES   $ .01  50  *    HALVES  $ .50  20  *      DENOMINATION
                                                    40 QUARTERS
NICKELS   $ .05  20  *    SBA     $ 1.00 25  *
                                                    TOTAL PIECES
NICKELS   $ .05  40  *    TOKEN   $ 1.00 20  *        1,320,000

DIMES     $ .10  50  *    TOKEN   $ 5.00 20  *      TOTAL ROLLS
                                                       33,000
QUARTERS $ .25  20  *    COIN 1              *

QUARTERS $ .25  40  *    COIN 2              *

ALL DENOMINATIONS  *     RETURN   *    CLEAR TOTALS  *
```

FIG. 26

| | | | | | |
|---|---|---|---|---|---|
| PENNIES | $ .01  50 * | HALVES | $ .50  20 * | DENOMINATION ALL | |
| NICKELS | $ .05  20 * | SBA | $ 1.00  25 * | | |
| NICKELS | $ .05  40 * | TOKEN | $ 1.00  20 * | TOTAL PIECES 11,320,000 | |
| DIMES | $ .10  50 * | TOKEN | $ 5.00  20 * | TOTAL ROLLS 251,555 | |
| QUARTERS | $ .25  20 * | COIN 1 | * | | |
| QUARTERS | $ .25  40 * | COIN 2 | * | | |
| ALL DENOMINATIONS * | | RETURN * | | CLEAR TOTALS * | |

*FIG. 27*

| | | | | | |
|---|---|---|---|---|---|
| PENNIES | $ .01  50 * | HALVES | $ .50  20 * | DENOMINATION ALL | |
| NICKELS | $ .05  20 * | SBA | $ 1.00  25 * | | |
| NICKELS | $ .05  40 * | TOKEN | $ 1.00  20 * | TOTAL PIECES 11,320,000 | |
| DIMES | $ .10  50 * | TOKEN | $ 5.00  20 * | TOTAL ROLLS 251,555 | |
| QUARTERS | $ .25  20 * | COIN 1 | * | ARE YOU SURE ? | |
| QUARTERS | $ .25  40 * | COIN 2 | * | YOU ARE CLEARING TOTALS | |
| ALL DENOMINATIONS * | | RETURN * | | CLEAR TOTALS * | |

*FIG. 28*

| | | | | | | |
|---|---|---|---|---|---|---|
| PENNIES | $ .01 50 * | HALVES | $ .50 20 * | | DENOMINATION ALL | |
| NICKELS | $ .05 20 * | SBA | $ 1.00 25 * | | | |
| NICKELS | $ .05 40 * | TOKEN | $ 1.00 20 * | | TOTAL PIECES 0 | |
| DIMES | $ .10 50 * | TOKEN | $ 5.00 20 * | | TOTAL ROLLS 0 | |
| QUARTERS | $ .25 20 * | COIN 1 | * | | | |
| QUARTERS | $ .25 40 * | COIN 2 | * | | ALL TOTALS CLEAR | |
| ALL DENOMINATIONS | * | RETURN | * | CLEAR TOTALS | * | |

*FIG. 29*

| | | | | | |
|---|---|---|---|---|---|
| | DENOMINATION | 40 | QUARTERS | | |
| DIAMETER | WIDER | * | NARROWER | * | SETTING 0 |
| THICKNESS | THICKER | * | THINNER | * | SETTING 0 |
| PAPER FEED | LONGER | * | SHORTER | * | SETTING 0 |
| | | RETURN | * | | |

*FIG. 30*

|  |  |  |  |  |  |
|---|---|---|---|---|---|
| DENOMINATION | | 40 | QUARTERS | | |
| DIAMETER | WIDER * | NARROWER | * | SETTING | +.5 |
| THICKNESS | THICKER * | THINNER | * | SETTING | 0 |
| PAPER FEED | LONGER * | SHORTER | * | SETTING | +2 |
| | | RETURN * | | | |

*FIG. 31*

| | | | |
|---|---|---|---|
| VOLTAGES GOOD | COIN TABLE FOR. | * | 1 |
| COUNT SENSOR 0 | COIN TABLE REV. | * | 0 |
| LEVEL SENSOR 1 | PAPER FEED MTR. | * | 0 |
| RESTEP SENSOR 0 | CONVEYOR BELT | * | 0 |
| HOME SENSOR 0 | WRAP ROLLER MTR. | * | 0 |
| ENCODER SENSOR 0 | STACKER MTR. CONT. | * | 0 |
| PAPER SENSOR 0 | STACKER MTR. STEP | * | 0 |
| PAPER FEED ENCODER 0 | SHUTTER SOLENOID | * | 0 |
| TOP DOOR SWITCH 0 | COIN STOPPER | * | 1 |
| FRONT DOOR SWITCH 0 | COIN FEED MTR. | * | 1 |
| | COIN FED CLUTCH | * | 1 |
| RETURN * | ADDITIONAL TESTS | | * |

*FIG. 32*

MAIN MOTOR CONT.        *
                                                                HEX
MAIN MOTOR STEPPING     *              POSITION _____   ____
                              PLUS   MINUS
DIAMETER ADJUSTMENT   *    *         POSITION _____   ____
THICKNESS ADJUSTMENT  *    *         POSITION _____   ____

RETURN      *           METRIC       *

*FIG. 33*

ADDRESS (HEX)     *    _____     7  8  9  A
                                   4  5  6  B
                                   1  2  3  C
CONTENTS (HEX)    *    _____     0  D  E  F

RETURN  *                          ENTER  *

*FIG. 34*

| ADDRESS (HEX) | * | 0 3 5 B | | 7 | 8 | 9 | A |
| --- | --- | --- | --- | --- | --- | --- | --- |
| | | | | 4 | 5 | 6 | B |
| | | | | 1 | 2 | 3 | C |
| CONTENTS (HEX) | * | 29 | | 0 | D | E | F |
| RETURN | * | | | ENTER | * | | |

SOFTWARE LOADING SYSTEM FOR A COIN WRAPPER

FIELD OF THE INVENTION

The present invention relates generally to coin wrapping machines for forming wrapped rolls of coins. More particularly, the present invention relates to a coin wrapping machine employing a touch screen device, and a means for quickly and efficiently loading software or software upgrades into the coin wrapping machine and for loading software replicated from one machine into another machine.

BACKGROUND OF THE INVENTION

Coin wrapping mechanisms automate the process of forming loose coins into wrapped rolls of coins. Coin wrapping machines typically include two or more rollers that hold a stack of coins in position to be wrapped. While the rollers hold the stack of coins in the proper position, a wrapping medium, such as adhesively backed paper or plastic, is wrapped about the coin roll. Typically, the rollers of coin wrapping machines are adjustable to allow coins of different diameters to be effectively wrapped.

In the more sophisticated of such coin wrapping machines, a system controller with associated control software is provided for controlling the operation of the machine. The control software is typically encoded by the manufacturer with a set of operating parameters associated with the machine, some or all of which may be customized or tailored by the user. An operator interface panel, including a touch screen keypad/display, may be provided to permit an operator or technician to customize the control software and/or communicate operating instructions to the system controller. The control software may be encoded with "default" settings associated with operation of the machine, including default display settings defining the positions and/or labels associated with particular keys, and defining the style and level of complexity of the various operating screens. Through the operator interface panel, the operator or technician may customize or re-program a portion of the control software by introducing the modified code via the touch screen keypad. For example, the user may customize or tailor the touch screen keypad/display to redefine the names or labels associated with particular keys, delete keys, reposition keys and/or modify the complexity of the operator interface panel to match the level of operator experience.

In addition to operator-initiated changes, the control software may be subject to periodic manufacturer-initiated changes. For example, the manufacturer may desire to modify the control software to correct design errors, make field updates, or produce coin wrapping mechanisms dedicated to special environments. Heretofore, software upgrades from the manufacturer have typically required removing, erasing, reprogramming and replacing the resident EPROM chips on which the control software resides. Because EPROM chips are sensitive to mechanical and electrostatic damage, neither of these steps can generally be accomplished by the operator, but must rather be accomplished by trained service personnel. In particular, mechanical damage to the chip is likely to occur during the removal process unless special tools are used to pry the chip from its socket within the machine. Once removed from the machine, EPROM chips are typically shipped to an offsite service center to be erased. Because of their sensitivity to damage, they must be shipped in special containers to protect them from mechanical and electrostatic damage. The chips are erased and reprogrammed at the service center and delivered to the customer, where they are reinstalled in the machines by trained service personnel.

In contrast, although the "customizable" portion of the control software may be changed with relative convenience at the operator interface panel, several keystrokes may be required depending on the extent of the changes. Moreover, because each coin wrapping machine may be operated by several individual operators, the customizable portion of the control software of each machine may be subject to frequent changes in order to accommodate the needs of each individual operator.

Accordingly, in view of the above problems, there is a need for a software loading system that enables users of coin wrapping machines to more quickly and easily update the system software and/or tailor the control software of their machines without removing and replacing resident memory chips and without entering several keystrokes. The present invention is directed to addressing these needs.

SUMMARY OF THE INVENTION

In accordance with one aspect of the present invention, there is provided a coin wrapping system including a coin wrapping mechanism for forming a coin stack containing a predetermined number of coins of a preselected denomination and wrapping a wrapping material about the coin stack to form a wrapped roll of coins. A system controller which is operable in a plurality of operating modes is coupled to the coin wrapping mechanism. An operator interface panel is coupled to the system controller. The operator interface panel includes a touch screen display for displaying data and sets of keys associated with operation of the coin wrapping system in respective ones of the operating modes. A resident memory is coupled to the system controller which contains a first version of control software to be executed by the system controller. A flash card having a flash card memory containing a second version of control software to be executed by the system controller is adapted to be removably electrically coupled to the coin wrapper. The resident memory erases the first version of control software and stores the second version of control software in response to the flash card being electrically coupled to the coin wrapper. The resident memory thereafter retains the second version of control software after the flash card is removed from the coin sorter.

In accordance with another aspect of the present invention, there is provided a coin wrapping machine including a coin wrapping mechanism, system controller and operator interface panel substantially as described above, further including a resident flash memory coupled to the system controller. Control software to be executed by the system controller includes customized display settings of the touch screen display associated with one or more of the operating modes of the coin wrapping machine. A flash card having a flash card memory is removably inserted into a socket which is electrically coupled to the resident flash memory of the coin wrapping machine. The control software is copied from the resident flash memory to the flash card memory when the flash card is inserted into the socket. The flash card may thereafter be removed from the socket and electrically coupled to a plurality of secondary coin wrapping machines to copy the control software from the flash card memory to the resident flash memories of the secondary coin wrapping machines.

BRIEF DESCRIPTION OF THE DRAWINGS

The foregoing and other advantages of the invention will become apparent upon reading the following detailed description and upon reference to the drawings in which:

FIG. 7 is in a basic operating mode;

FIG. 10 is a diagrammatic representation of the touch screen device in FIG. 8 showing a denomination select and mode set-up screen after the operator powers up the coin wrapping system;

FIG. 11 is a diagrammatic representation of the touch screen device in FIG. 8 showing a denomination select and mode set-up screen after the operator sets up the coin wrapping system for wrapping;

FIG. 12 is a diagrammatic representation of the touch screen device in FIG. 8 showing an operational screen after the controller in FIG. 3 or FIG. 7 configures the coin wrapping system for wrapping;

FIG. 13 is a diagrammatic representation of the touch screen device in FIG. 8 showing an operational screen after the coin wrapping system has stopped wrapping or bagging;

FIG. 14 is a diagrammatic representation of the touch screen device in FIG. 8 showing a denomination select and mode set-up screen after the operator sets up the coin wrapping system for bagging;

FIG. 15 is a diagrammatic representation of the touch screen device in FIG. 8 showing an operational screen after the controller in FIG. 3 or FIG. 7 configures the coin wrapping system for bagging;

FIG. 16 is a diagrammatic representation of the touch screen device in FIG. 8 showing an operational screen after the coin wrapping system stops due to an operational error;

FIG. 7 is in a basic operating mode;

FIG. 18 is a diagrammatic representation of the touch screen device in FIG. 8 showing an operational screen after the coin wrapping system has stopped wrapping or bagging;

FIG. 19 is a diagrammatic representation of the touch screen device in FIG. 8 showing an operational screen while coins are being cleared from a stacker of the coin wrapping system;

FIG. 20 is a diagrammatic representation of the touch screen device in FIG. 8 showing an operational screen requesting confirmation that current coin totals should be cleared from memory;

FIG. 21 is a diagrammatic representation of the touch screen device in FIG. 8 showing an operational screen indicating that coins have been cleared from the stacker of the coin wrapping system;

FIG. 22 is a diagrammatic representation of the touch screen device in FIG. 8 showing an operational screen indicating that current coin totals have been cleared from memory;

FIG. 23 is a diagrammatic representation of the touch screen device in FIG. 8 showing an operational screen indicating that current coin totals have been added to memory;

FIG. 25 is a diagrammatic representation of the touch screen device in FIG. 8 showing a menu select screen used to enter the memory recall mode, adjustment for wrap quality mode, diagnostics mode, and programming mode;

FIG. 26 is a diagrammatic representation of the touch screen device in FIG. 8 showing a memory recall screen employed in the memory recall mode after the operator has pressed a particular denomination key;

FIG. 27 is a diagrammatic representation of the touch screen device in FIG. 8 showing the memory recall screen after the operator has pressed an all denominations key;

FIG. 28 is a diagrammatic representation of the touch screen device in FIG. 8 showing the memory recall screen requesting confirmation that cumulative coin totals should be cleared from memory;

FIG. 29 is a diagrammatic representation of the touch screen device in FIG. 8 showing the memory recall screen indicating that cumulative coin totals have been cleared from memory;

FIG. 30 is a diagrammatic representation of the touch screen device in FIG. 8 showing default settings on an adjustments for wrap quality screen employed in the adjustments for wrap quality mode;

FIG. 31 is a diagrammatic representation of the touch screen device in FIG. 8 showing modified settings on the adjustments for wrap quality screen;

FIG. 32 is a diagrammatic representation of the touch screen device in FIG. 8 showing a first diagnostics screen employed in the diagnostics mode;

FIG. 33 is a diagrammatic representation of the touch screen device in FIG. 8 showing a second diagnostics screen employed in the diagnostics mode;

FIG. 34 is a diagrammatic representation of the touch screen device in FIG. 8 showing a program changes screen employed in the programming mode prior to selecting a hex address to make programming changes;

FIG. 35 is a diagrammatic representation of the touch screen device in FIG. 8 showing the program changes screen after selecting a hex address to make programming changes;

DESCRIPTION OF SPECIFIC EMBODIMENTS

For purposes of illustration, the coin wrapping system with touch screen device and software loading system of the present invention is described for use with the coin wrapping mechanism disclosed in U.S. Pat. No. 5,573,457, which is hereby incorporated by reference in its entirety. It should be understood that this is a preferred embodiment of the present invention, and that it may take various other forms as needed to be adapted to other types of coin wrapping mechanisms. Other exemplary coin wrapping mechanisms suitable for use with the touch screen device described below are disclosed in U.S. Pat. Nos. 5,155,978; 5,129,205; 5,011,457; 5,002,516; 4,996,822; 4,897,984; 4,896,481; 4,869,029; 4,835,938; 4,718,218; 4,674,260; 4,509,542; 4,409,773; and 4,353,195. Each of these enumerated patents is incorporated herein by reference in its entirety.

Figure 1:
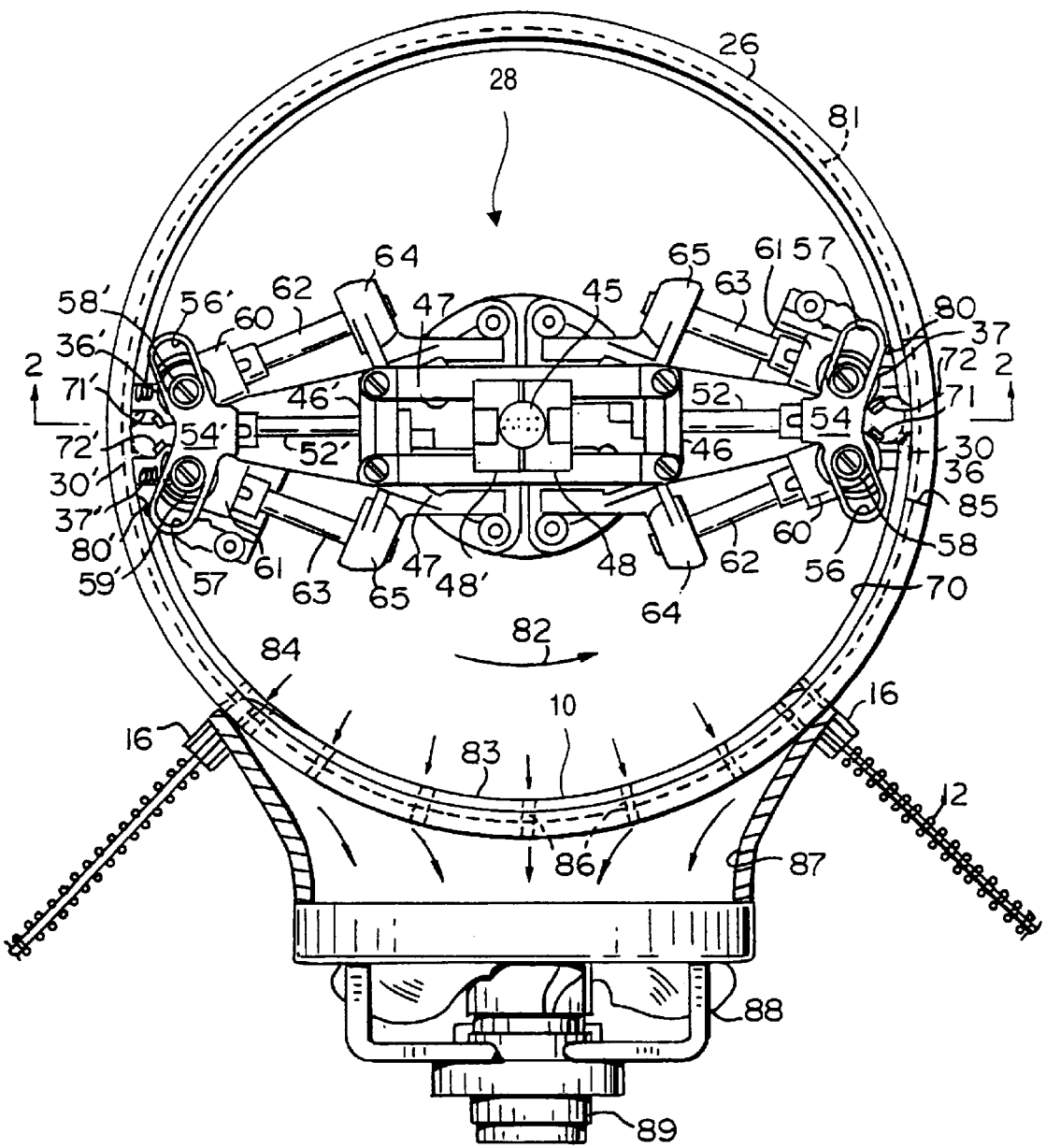
FIG. 1 is a top view of a coin wrapping mechanism preferred for use with a coin wrapping system embodying the present invention.
Figure 2:
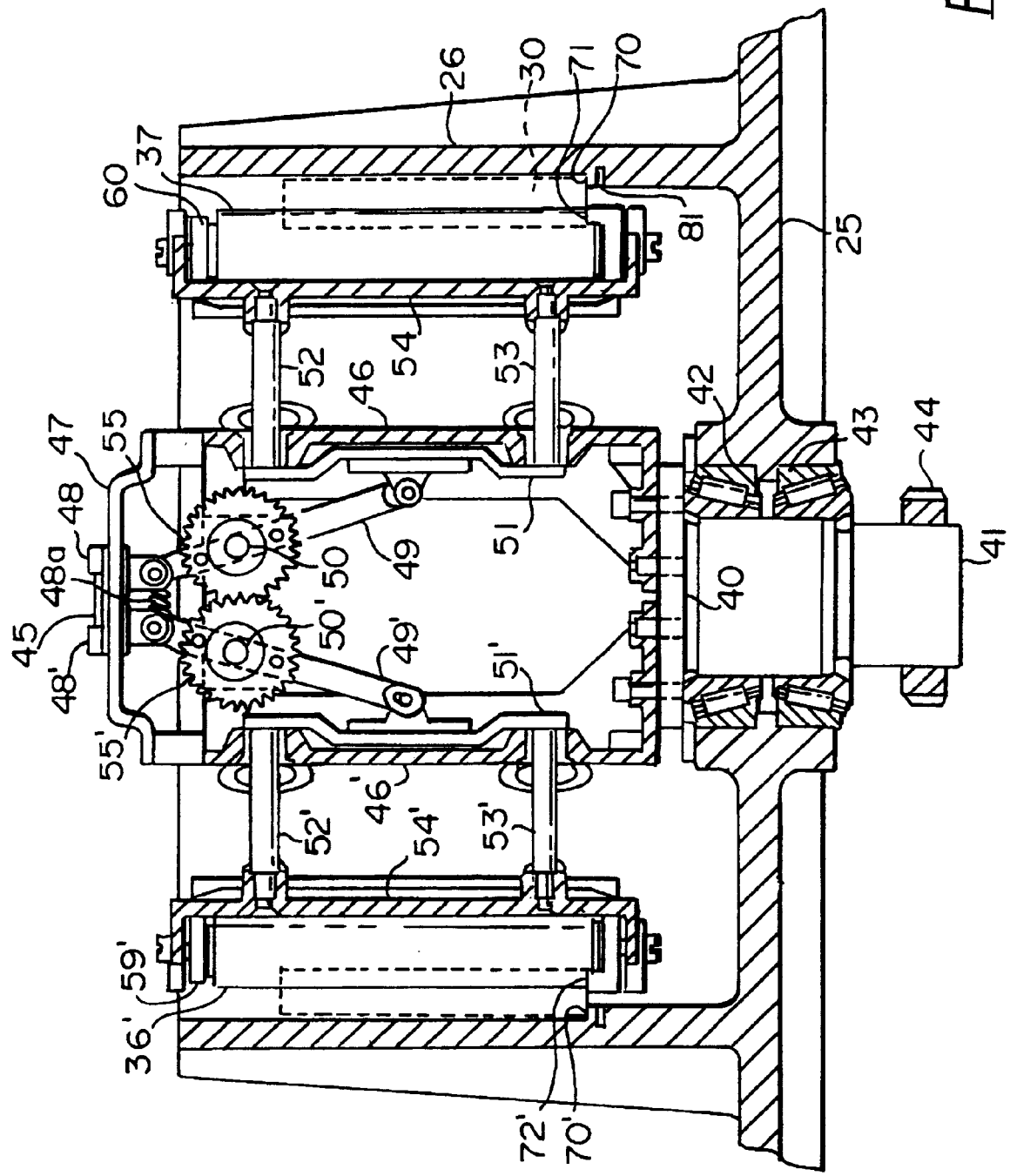
FIG. 2 is a section taken generally along line 2—2 in FIG. 1.

Turning now to the drawings, FIGS. 1 and 2 illustrate detailed elements of the preferred coin wrapping mechanism. The preferred coin wrapping mechanism in FIGS. 1 and 2 employs a conventional coin feed and stacking arrangement (not shown) which forms a coin stack 30 to be wrapped with the coin wrapping mechanism. In this coin feed and stacking arrangement, coins of a selected denomination from a bag of loose coins are loaded into a coin hopper. The coin hopper delivers the loaded coins to a conveyor belt, which, in turn, deposits the coins on a conventional turntable. As the turntable is rotated, the coins deposited on the top surface thereof tend to slide outwardly over the top surface due to centrifugal force. The centrifugal force drives the coins to the outer circuference of the turntable, where the coins are then carried off the turntable and onto a stationary coin track. A drive belt, mounted over the coin track, drives the coins downstream along the stationary coin track. The coins are driven downstream along the coin track in a single file and single layer. As described below, the width of the coin track is adjusted to be approximately equal to the diameter of the coins of the selected denomination. As the coins are driven downstream along the coin track, the coins pass a coin sensor which counts the individual coins. The coin track feeds a prescribed number of coins of the selected denomination, as counted by the coin sensor,to a conventional coin stacker/ tube which stacks the prescribed number of coins in a controlled fashion to form the coin stack 30. The coin stack 30 may be formed by any of a variety of different coin stackers, such as the one described in U.S. Pat. No. 4,515,172 to Nakamura et al., which is incorporated herein by reference in its entirety. Such coin stackers typically have a shutter which opens each time it is desired to load a new coin stack into the wrapping mechanism.

In the coin wrapping mechanism, the coin stack 30 is lowered into a cylindrical chamber 26. The cylindrical chamber 26 surrounds a rotatable portion 28 of the mechanism. The entire rotatable portion 28 of the wrapping mechanism is supported on a flange 40 on the end of a driven spindle 41 mounted for rotation in two sets of roller bearings 42 and 43 in the base plate 25 of the wrapping chamber 26. The lower end of the spindle 41 carries a gear 44 which is connected to a suitable drive means (e.g., a stepper motor) for rotating the spindle 41 in increments of 180 degrees.

As the spindle 41 and the base plate 45 are rotated, they carry with them a central frame formed by a pair of columns 46 and 46' which are rigidly fastened to the base plate 25 by machine screws. The upper ends of the columns 46 and 46' are connected by a crown 47 which also serves as a track for a pair of adjustment members 48 and 48' which are biased toward each other by a spring 48A. The tops of the adjustment members 48, 48' form a pair of adjustment lugs between which an elliptical cam 100 (FIG. 3) is inserted to space the members 48, 48' apart by a distance proportional to the diameter of the coins in a stack of coins to be wrapped. Thus, the members 48 and 48' are spaced apart along the track formed by the crown 47 by a maximum amount when spaced apart along the major axis of 102 (FIG. 4) of the elliptical cam 100, and by a minimum amount when spaced apart by the minor axis 104 (FIG. 4) of the elliptical cam 100. The precise function of the elliptical cam 100 will be fully explained in reference to FIGS. 3 and 4.

Each time the spacing of the adjustment members 48 and 48' is adjusted, the radical positions of the two pair of wrapping rollers 36, 37 and 36', 37' are automatically adjusted by a mechanism comprising a pair of control arms 49 and 49' mounted for pivotal movements about fixed shafts 50 and 50'; a pair of yokes 51 and 51' connecting the lower ends of the respective control arms 50 and 50' to the ends of respective pairs of sliding rods 52, 52' and 53, 53'; and a pair of brackets 54 and 54' fastened to the outer ends of the rods 52, 52' and 53, 53' for positioning the wrapping rollers 36, 37, and 36', 37'.

To interconnect the two halves of the adjustment mechanism connected to the two adjustment members 48 and 48', the shafts 50 and 50' carry two pairs of meshing gears 55 and 55'. Because of this gear connection, movement of either of the adjustment members 48 and 48' along the crown 47 results in a corresponding movement of the other adjustment member, thereby ensuring that the two halves of the adjustment mechanism are moved in synchronism with each other and by precisely the same amounts.

In order to properly position the wrapped rollers 36, 37 and 36', 37' in response to adjusting movement of the rods 52, 53 and 52', 53', the upper and lower ends of the brackets 54 and 54' form camming slots 56, 57 and 56', 57' (see FIG. 1). These camming slots receive cam followers 58, 59 and 58', 59' on the shafts of the respective wrapping rollers 36, 37 and 36', 37', so that the wrapping rollers are cammed to different positions determined by the shape of the camming slots 56, 57 and 56', 57' whenever the rods 52, 53 and 52', 53' are adjusted. Since the adjusting movement of the rods 52, 53 and 52', 53' is determined by the length between diametrically opposed edges of the elliptical cam 100 which is inserted between the two adjustment member 48 and 48', the camming slots 56, 57 and 56', 57' are designed to move the wrapping rollers to precisely the desired position for each different coin denomination. That is, the diameter of a circle touching the surfaces of the two rollers 36 and 37 and the inner wall of the cylinder called chamber 26 (see broken-line circles 30 and 30' in FIG. 1) should be just slightly larger than the diameter of the particular coin denomination to be wrapped.

To support the wrapping rollers in fixed vertical positions, each wrapping roller 36 and 37 is mounted on its own bracket 60 or 61, respectively. The shafts of the wrapping rollers extend through the horizontal arms of these brackets 60 and 61, and the brackets in turn are fastened to upper and lower pairs of guide rods 62 and 63 extending inwardly therefrom through corresponding bosses 64 and 65 on the corners of the support column 46. The rods 62 and 63 are slidably supported within the bosses 64 and 65 to permit the wrapping rollers 36 and 37 to move back and forth along the axes of these rods in response to the camming action described above. Of course, the other pair of wrapping rollers 36' and 37' are equipped with similar brackets 60' and 61' fastened to guide rods 62' and 63' extending through bosses 64' and 65'.

When the control arms 49, 49' are pivoted in response to rotation of the elliptical cam 100 between the two adjustment members 48, 48', the radial positions of the wrapping rollers 36, 37 and 36', 37' are automatically adjusted to accommodate stacks of coins of a predetermined denomination. The adjustability of this mechanism is universal in the sense that it can be stopped anywhere between its end limits, so that it can accommodate any number of different coins or tokens. This permits the same mechanism to be used for coins of different countries, for example. The space between the wrap rollers is set to accept a stack of coins by allowing a clearance around the stack of coins. This clearance allows for a variance in the coin diameter, maintains a uniform stack, and allows for a wrapping medium to be wrapped about the stack.

After the wrapping rollers 36, 37 and 36', 37' have been positioned to receive stacks of coins of the desired denomination, a stack of such coins is lowered into the cylindrical chamber 36. The stack of coins is supported between a set of three supports 70, 71 and 72 which engage the bottom of the coin stack 38 throughout the wrapping operation and permit the coin stack 30 to be rotated as it is rolled about the inner surface of the cylindrical chamber.

A driven sprocket belt 12, which is disposed about sprocket wheels 16, engages with an adhesively backed paper web 10 and pulls the paper web 10 upwardly through a slot (not shown) and onto the inner wall of the cylindrical chamber 26 that is lined with a resilient pad 83. To ensure that the paper remains against the pad 83, a light vacuum is preferably applied to the paper surface which faces the inner wall. As illustrated in FIG. 1, both the pad 83 and the corresponding portion of the inner wall are perforated by apertures 86 opening into a manifold 87 that leads to a suction fan 88. A motor 89 drives the fan 88 to exhaust air from the manifold 87 and thereby draws the paper web 10 firmly against the pad 83.

To effect the wrapping of a coin stack 30 after it has been deposited on the supports 70, 71, 72, the spindle 41 is rotated in a direction indicated by the arrow 82 in FIG. 1. This moves the wrapping rollers 36, 37 in the same direction, carrying the coin stack 30 with them along the inner surface of the cylindrical chamber 26 and across the adhesively coated surface of the paper web 10. The resilient pad 83 ensures that the paper web 10 is pressed into firm engagement with the coin stack 30. The leading edge 84 of the pad 83 is beveled so that the coin stack 30 rolls smoothly across the edge of the pad 83 and onto the paper web 10, thereby compressing the pad 83 so that the pad 83 applies biasing pressure on the paper web 10 to urge it against the coin stack 30. The pad 83 extends along the full circumferential length of the paper web 10, so that the biasing pressure is applied throughout the wrapping of the coin stack 30.

After the coin stack 30 has been rolled across the entire circumferential length of the paper web 10 by the orbiting movement of the wrapping rollers 36, 37, the spindle 41 continues to move the rollers to a positions diametrically opposed to the position where the coin stack 30 was initially loaded. This 180 degree movement of the wrapping rollers 36, 37 brings the wrapped roll of coins into register with an aperture 85 in the wall of the cylindrical wall of the chamber 26 through which the wrapped coin roll 30 can be discharged from the cylindrical chamber 26.

Figure 4:
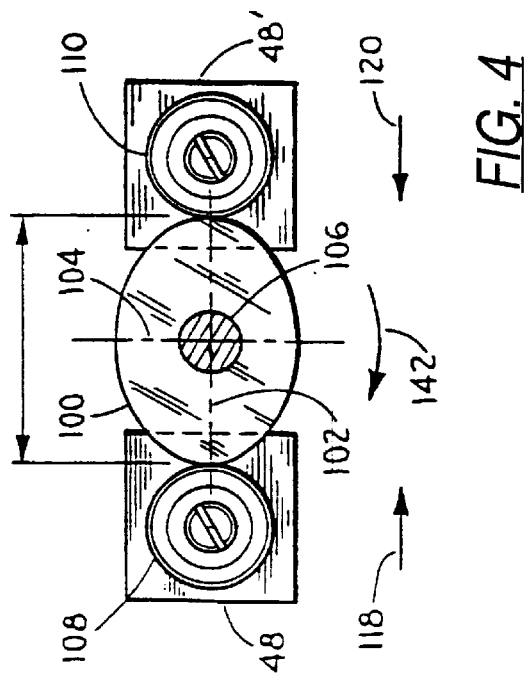
FIG. 4 is a section taken generally along line 4—4 in FIG. 3.
Figure 3:
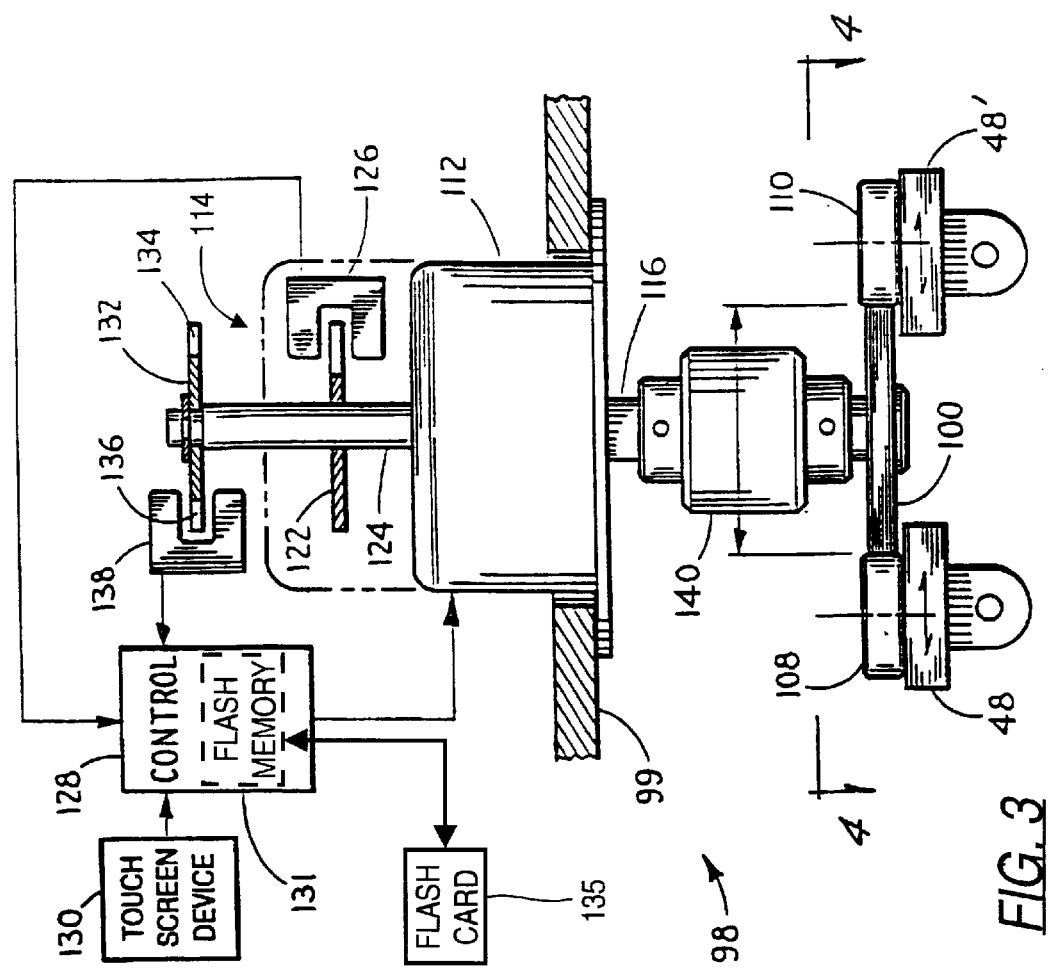
FIG. 3 is a side view of an automatic adjustment device for use with the coin wrapping mechanism of FIG. 1 and illustrating a software loading capability according to one embodiment of the present invention.

Referring now to FIGS. 3 and 4, there is illustrated an automatic device 98 for use with the coin wrapping mechanism. Preferably, the automatic adjustment device 98 is mounted above at least a portion of the rotatable portion 28 by a fixed housing 99. As previously stated, the elliptical cam 100 of the automatic adjustment device 98 is disposed between the adjustment members 48 and 48'.

The elliptical cam 100 is defined by a major axis 102 and a minor axis 104 which are perpendicular to one another and which intersect at the center of rotation 106 of the elliptical cam. The center of rotation 106 is axially aligned with the center of rotation of the rotatable portion 28 of the wrapping mechanism and with the mid-point between the sliding adjustment members 48 and 48'. The length of the major axis 102 represents the maximum adjustment limit of the elliptical cam 100, and the length of the minor axis 104 represents the minimum adjustment limit of the elliptical cam 100. Rotation of the cam 100 controllably moves the adjustment members 48, 48', and, thus, the wrapping rollers 36, 37, to any one of the infinite positions between the maximum and minimum limits.

The elliptical cam 100 is adapted to rotate with respect to the adjustment members 48 and 48'. Preferably, a roller cam follower 108, 110 is connected to each respective adjustment member 48, 48'. The addition of the roller cam followers 108, 110 reduces the friction and wear of the edge of the elliptical cam 100 when the cam 100 is rotated.

The center 106 of the elliptical cam 100 is operably connected to a motor 112. The motor 112 is adapted to rotate the cam 100 in at least one direction with respect to the adjustment members 48 and 48'. The motor 112 outputs rotational motion via a lower output shaft 116 which is operably connected to the center of rotation 106 of the elliptical cam 100. As the motor 112 rotates the cam 100, the distance between the adjustment members 48 and 48' changes in response to the changing distance between the diametrically opposed edges of the elliptical cam 100 that contact the cam followers 108 and 110. Preferably, the cam followers 108 and 110 are inwardly biased toward one another in the direction of arrows 118 and 120 in order to maintain contact between the diametrically opposed edges of the elliptical cam 100 and the cam followers 108 and 110.

The motor 112 includes means for monitoring its rotation, such as an encoder assembly 114. As the motor 112 rotates, an encoder disc 122 in the encoder assembly 114 rotates on an upper output shaft 124 of the motor 112. The encoder disc 122 includes a multitude of slots (not shown) about its outer periphery. A sensor 126 is disposed proximate the outer periphery of the encoder disc 122, and generates pulses as the slots in the outer periphery of the encoder disc 122 pass through the sensor 126. Preferably, the upper output shaft 124 also carries a home position disc 132 which includes two diametrically opposed slots 134 and 136 in its outer periphery. A sensor 138 is disposed proximate the outer periphery of the home position disc 132, and generates a pulse each time one of the slots 134, 136 is rotated through the sensor 138. The slots 134 and 136 are related to a specific position of the elliptical cam 100. As shown, the diametrically opposed slots 134 and 136 indicate that the elliptical cam 100 is positioned with its major axis 102 separating the adjustment members 48 and 48'.

A system controller 128 receives signals from the sensors 126 and 138. The pulses delivered by the sensors 126 and 138 are interpreted by the controller 128, and equated to distinct positions of the elliptical cam 100. By equating the number and timing of pulses to a given adjustment, the controller 128 can activate the motor 112 to selectively rotate the elliptical cam 100 to a predetermined position so that a coin having a preselected diameter between the lower and upper limits may be effectively wrapped in the wrapping mechanism. This is extremely useful if it is desirable to use the coin wrapping mechanism to wrap a previously unknown coin or token.

Preferably, the diameter of an unknown coin or token is entered into the system controller 128 via a touch screen device 130. The touch screen device 130 will be described in detail below. The controller 128 receives the diameter input from the touch screen device 130, and calculates the required clearances of the wrapping rollers 36, 37 for a coin of that diameter. Alternatively, the controller 128 may select an appropriate clearance from a table or curve stored in the memory. The controller 128 then signals the motor 112 to rotate by a predetermined amount to accurately position the elliptical cam 100 so that the wrapping rollers 36 and 37 are adjusted to properly accept a stack of coins of the particular diameter. A particular known type of coin may also be entered on the touch screen device 130. In this case, the memory 131 stores a predetermined clearance for that coin and the amount that the motor 112 should be turned in order to properly position the elliptical cam 100, and, thus, the wrapping rollers 36 and 37.

Rotation of the motor 112 by 90 degrees adjusts the wrapping rollers 36 and 37 from their upper limits to their lower limit. Each time a different coin denomination is to be wrapped, the proper code is entered on the touch screen device 130 and the proper position of the motor is determined by the controller 128. The controller 128 signals the motor 112 to rotate until a signal is received from the sensor 138, which indicates that the elliptical cam 100 is in a known position. The controller 128 then signals the motor 112 to rotate by a predetermined amount which is accurately controlled via the feedback provided by the encoding disc 122 and associated sensor 126.

Control software associated with the system controller 128 is stored in a resident "flash memory" 131, which in turn is adapted to be electrically connected to a flash card 135. Generally, the control software includes operating instructions and parameters for the coin wrapping system, including those which have been initiated by the manufacturer and those which have been tailored or customized by the operator. Electrical signals communicated between the flash card 135 and flash memory 131 may cause the control software to be copied from the flash card 135 to the flash memory 131 or vice versa. The flash card 135 may thereafter be introduced into additional machines, as will be described in detail hereinafter.

As will be appreciated by those skilled in the art, the resident memory need not be comprised of a flash memory but may be comprised of any of several alternative types of memories known in the art, including electrically erasable programmable read only memories (EEPROMs) or random access memories (RAMs). Nevertheless, flash memories are preferred because they are nonvolatile (e.g. their data content is preserved without requiring connection to a power supply), they may be electrically erased and reprogrammed within fractions of a second by simply sending electrical control signals to the flash memory while it remains within the machine, and they are less expensive than EEPROMs. In one embodiment, the resident flash memory 131 is electrically programmable in sectors so that portions of the memory can be individually erased and reprogrammed. An example of a specific type of flash memory which may be used in the coin wrapping system is product number Am29F010, commercially available from Advanced Micro Devices, Inc. ("AMD") of Sunnyvale, Calif. and described in detail in AMD's publication entitled "Flash Memory Products—1996 Data Book/Handbook", incorporated herein by reference in its entirety. However, those skilled in the art will appreciate that other types of flash memorys may be utilized, depending on the system memory requirements and desired operating characteristics.

For added flexibility, according to one embodiment of the present invention, means for quickly and easily installing or removing the resident flash memory 131 from the coin wrapping machine may be provided. As will be appreciated, there are several devices known in the art which may be utilized to accomplish this purpose. One solution is to house the flash memory chip in a zero insertion force ("ZIF") socket, in which movable contacts can be opened to facilitate insertion or removal of the chip in the socket without damaging the lead pins of the chip. The ZIF-type socket is not limited to use with a flash memory. Typically, the movable contacts of the ZIF socket may be opened by simply depressing a lever or button on the surface of the socket. Examples of ZIF-type sockets are disclosed in U.S. Pat. No. 5,342,213 ('213 patent), incorporated herein by reference in their entirety and designated herein as FIGS. 5a and 5b, respectively.

Figure 5A:
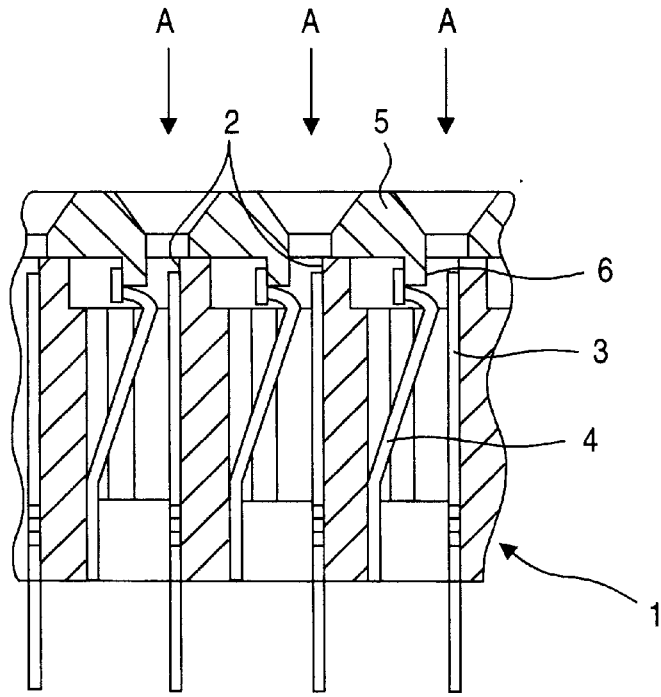
FIGS. 5a and 5b are cross sectional views of ZIF-type sockets which may be used to house the resident memory of the present invention.

FIG. 5a shows an example of a conventional ZIF-type socket. As described in the '213 patent, the socket has holes 2 on the surface of a socket body 1. Lead pins of an IC device are inserted into the holes 2 as indicated with arrows A. After being inserted through the holes 2, the lead pins encounter contacts positioned beneath the holes 2 for receiving the lead pins. Each of the contacts is made up of a first contact element 3 that is fixed and a second contact element 4 that is elastically deformable. Lead pins are inserted between the first and second contact elements 3 and 4, and then locked. An actuator 5 is installed to open or close the contacts. In the example shown in FIG. 5a, the actuator 5 is formed with a movable plate arranged on the surface of the socket body 1, and has engaging means 6 that engage with the tops of the second contact elements 4. When lead pins are inserted, the actuator 5 is moved left. Then, the second contact elements 4 are moved left accordingly. Thereby, openings are created between the second contact elements 4 and the first contact elements 3. The lead pins are inserted smoothly without being subject to applied force by the contacts. When the lead pins are inserted into the contacts, the actuator 5 is moved right. Then, the second contact members are moved right and reset to the original positions. Eventually, the lead pins are held between the first and second contact elements 3 and 4.

Figure 5B:
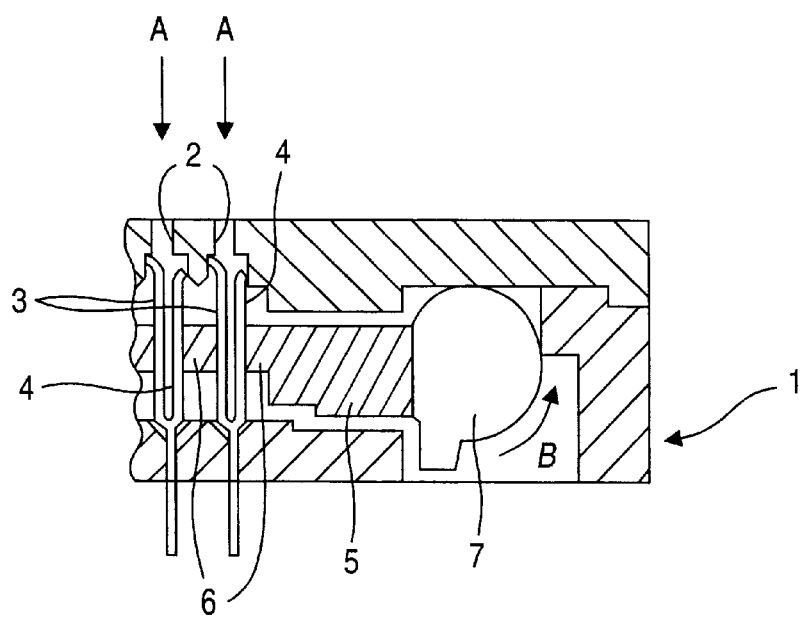

FIG. 5b shows another example of a conventional ZIF-type socket. As described in the '213 patent, the socket has holes 2 on the surface of a socket body 1. Lead pins of an IC device are inserted into the holes 2 as indicated with arrows A. After being inserted through the holes 2, the lead pins encounter contacts positioned beneath the holes 2 for receiving the lead pins. Each of the contacts includes a first contact element 3 that is fixed and a second contact element 4 that is elastically deformable. The lead pins are inserted and held between the first and second contact elements 3 and 4. An actuator 5 is provided to open or close the contacts. In the example shown in FIG. 5b, the actuator 5 is arranged inside the socket body 1 and includes an engaging means 6 for pressing the second contact elements 4 toward the first contact elements 3. The actuator 5 is pressed leftward by a cam 7. When lead pins are inserted, the actuator 5 lies at a position as illustrated. Openings are created between the second contact element 4 and the first contact elements 3. The lead pins are inserted smoothly without being subject to appied forces by the contacts. When the lead pins are inserted into the contacts, the cam 7 is rotated in the direction of arrow B to move the actuator 5 to the left. Then, the second contact elements 4 are moved toward the first contact elements 3. The lead pins are held between the first and second contact elements 3 and 4. In FIGS. 5a and 5b, the first and second contact elements 3 and 4 are connected to a circuit board.

Figure 6:
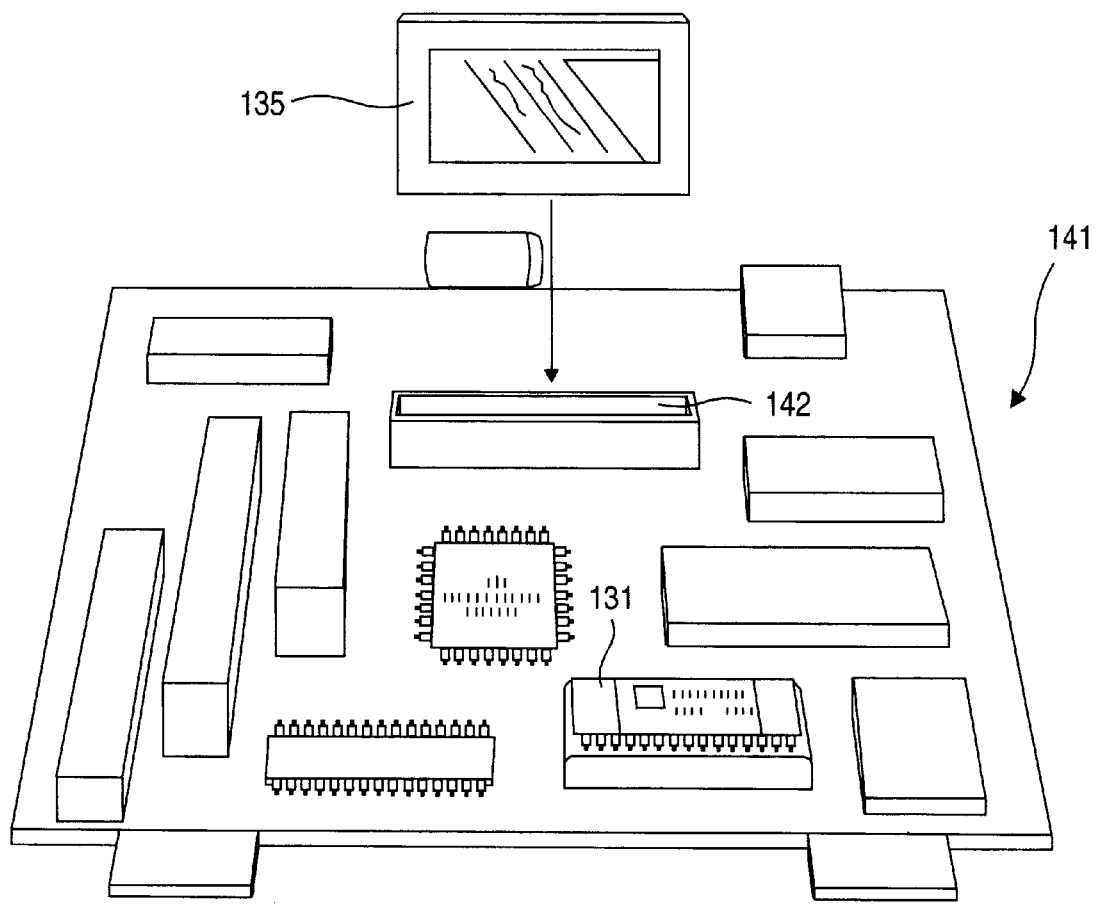
FIG. 6 is an isometric view depicting a socket for accepting a flash card according to one embodiment of the present invention.

Now referring to FIG. 6, there is shown a circuit board assembly 141 including a socket 142 adapted to receive the flash card 135 according to one embodiment of the invention. The socket 142 is electrically connected to the resident flash memory 131 of the coin wrapping system by means of an electrical path (not shown) on the circuit board assembly 141. Typically, the circuit board assembly 141 is enclosed within an external housing (not shown) of the coin wrapping machine, with an external slot (not shown) positioned adjacent to the socket 142 such that the flash card 135 may access the socket 142 without removing the external housing. Upon insertion of the flash card 135 into the socket 142, electrical signals are communicated between the flash card 135 and the resident flash memory 131 of the coin wrapping system.

The flash card 135 contains its own memory which, for example, may be encoded with software reflecting updated operating instructions and parameters for the coin wrapping machine. In one embodiment, the flash card 135 is programmed with such code by the manufacturer, with the resident flash memory 131 adapted to read and copy the updated code and the system controller 128 (FIG. 3) executing the updated code. Alternatively or additionally, the process may be reversed, with the flash card 135 reading and copying the code from the resident flash memory 131 of a particular coin wrapping machine. The flash card memory may then be copied onto the resident flash memories 131 of a plurality of additional coin wrapping machines in the manner described above, causing the resident flash memory 131 of the initial machine to be "cloned" onto the resident flash memories 131 of the additional machines. In such case, the system controller 128 (FIG. 3) of the additional machines will thereby execute control sofware which is identical to the control software of the "cloned" machine. Similar to the system memory, the flash card memory need not be a flash memory but may be comprised of any of several other types of memorys known in the art, including electrically eraseable programmable read only memorys (EEPROMs) or one-time programmable read-only memorys. Nevertheless, a flash memory is preferred because it offers a high degree of versatility at a relatively low cost.

The flash card 135 should be small and lightweight, sturdy enough to withstand multiple uses, and adapted to be easily insertable into the slot (not shown) and corresponding socket 142 of the coin wrapping system by users not having any special training. Further, the flash card 135 should not require any special electrostatic or physical protection to protect it from damage during shipping and handling. One type of flash card that has been found to satisfy these criteria is the FlashLite™ Memory Card available from AMP, Inc. of Harrisburg, Pa. However, it is envisioned that other suitable types of flash cards will become available from other manufacturers. The FlashLite™ card has a thickness of 3.3 mm (⅛ inch), a width of approximately 45 mm (1.8 inches) and a 68-pin connector interface compatible with the Personal Computer Memory Card International Association (PCMCIA) industry standards. Its length may be varied to suit the needs of the user. In one embodiment, two sizes of flashcards (designated "half size" and "full size") have lengths of 2.1 inches (53 mm) and 3.3 inches (84 mm), respectively, but other sizes of flash cards may also be utilized.

In one embodiment of the present invention, the socket 142 comprises a PCMCIA-compatible 68-position receptacle for receiving a flash card such as the above described FlashLite™ card. For example, one type of socket that may be used for this purpose is AMP, Inc. product number 146773-1, which is adapted to extend vertically from the circuit board assembly 60. However, it will be appreciated that other types of sockets may be utilized, including those positioned horizontally in relation to the circuit board assembly 141, or those including a lever or button which may be depressed to eject the flash card 135 from the socket 142.

Upon insertion of the flash card 135 into the socket 142, the system controller 128 (FIG. 3) is capable of electrically detecting the presence of the card. If the FlashLite™ card is used, this is accomplished by means of two specially designated connector pins $CD_1$ and $CD_2$ (assigned to pin numbers 36 and 67, respectively) being shorted to ground. The system controller 128 then compares the contents of the flash card memory with the contents of the resident flash memory. If the contents of the memorys are the same, an audible or visual message is provided to the user indicating that the process is concluded. If the contents of the memorys are different, the required sectors in the resident flash memory 131 are erased and the new code is copied from the flash card 135 to the resident flash memory 131. Upon successful completion of the memory transfer, an audible or visual message is provided to the user indicating that the process is concluded. The flash card 135 can thereafter be unplugged from the socket 142 and plugged into the corresponding sockets 142 of any other coin wrapping machines requiring a software update. In the event of an unsuccessful memory transfer, the machine will automatically re-attempt the transfer until, after multiple unsuccessful attempts, the user will be advised that there is a hard system failure and to call for service. Optionally, the flash card 135 may include a counter for limiting the number of times that a given flash card 135 may be copied into the resident flash memory of additional machines. For example, the flash card 135 may include a cycle count byte which is preset to a designated number and decrements upon each copy cycle.

The flash card 135 may also be used in a reverse manner, to "clone" a particular machine by copying the resident memory 131 of the machine onto a flash card 135 and subsequently using the flash card 135 to introduce the identical code into other machines. In this case, upon connection of the flash card 135 to the resident flash memory 131, if the contents of the memorys are different, the required sectors in the flash card memory are erased and replaced with new code copied from the resident flash memory 131. If the contents of the memorys are the same, an audible or visual message is provided to the user indicating that the process is concluded. Upon successful completion of the memory transfer, the flash card memory becomes programmed with the same set of control software as the resident flash memory 131. The flash card 135 can thereafter be removed from the coin sorting machine and plugged into any other coin sorting machine requiring the "cloned" control software. The control software is copied from the flash card memory to the flash memory 131 of the additional machines in substantially the same manner (although reversed) as they were initially copied onto the flash card 135. In the event of an unsuccessful memory transfer, the machine will automatically re-attempt the transfer until, after multiple unsuccessful attempts, the user will be advised that there is a hard system failure and to call for service.

Figure 7:
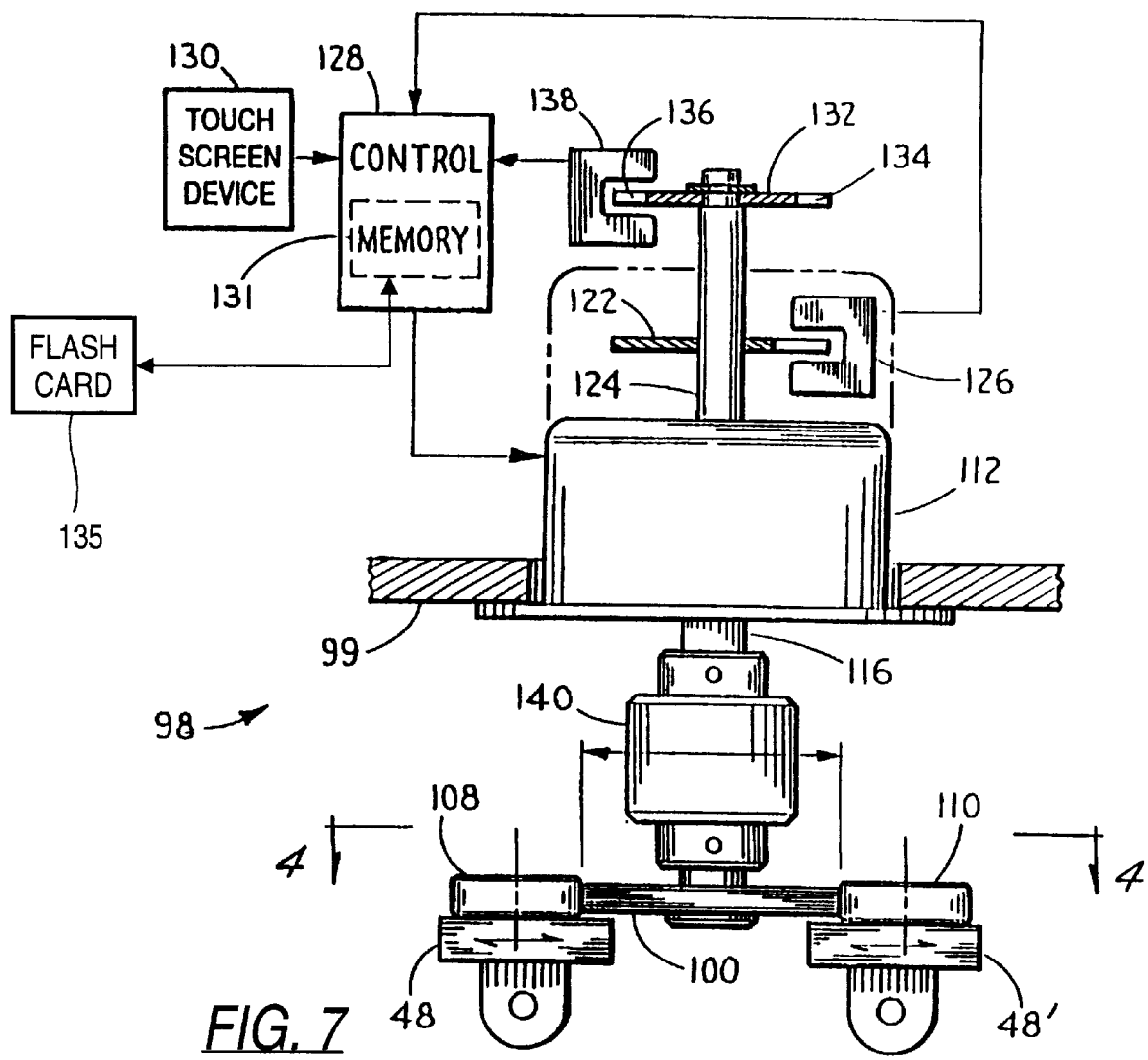
FIG. 7 is a side view of the automatic adjustment device of FIG. 3 and illustrating a software loading capability according to another embodiment of the present invention.

Referring now to FIG. 7, there is shown an alternative embodiment of a processor-based coin wrapping system with software loading capability according to principles of the present invention. In the illustrated embodiment, the coin wrapping system is identical to that shown in FIGS. 1–4 except the control system 128 includes a system memory 131 which is not a flash memory. For example, the system memory 58 may comprise an EPROM or other alternate type of non-flash memory. The coin wrapper is also provided with a socket (not shown) adapted to receive a flash card 135 as described in relation to FIG. 6. Upon insertion of the flash card 135 into the socket, the system controller 128 electrically detects the presence of the card and executes the code directly from the flash card memory as long as the flash card 135 remains inserted in the socket. If the flash card 135 were to be removed from the socket, the system controller 128 would revert to executing the old code from the system memory 131. In this embodiment, because the flash card 135 must remain inserted in the socket in order to execute the updated code, each coin wrapping system will generally be equipped with its own dedicated flash card 135.

Figure 8:
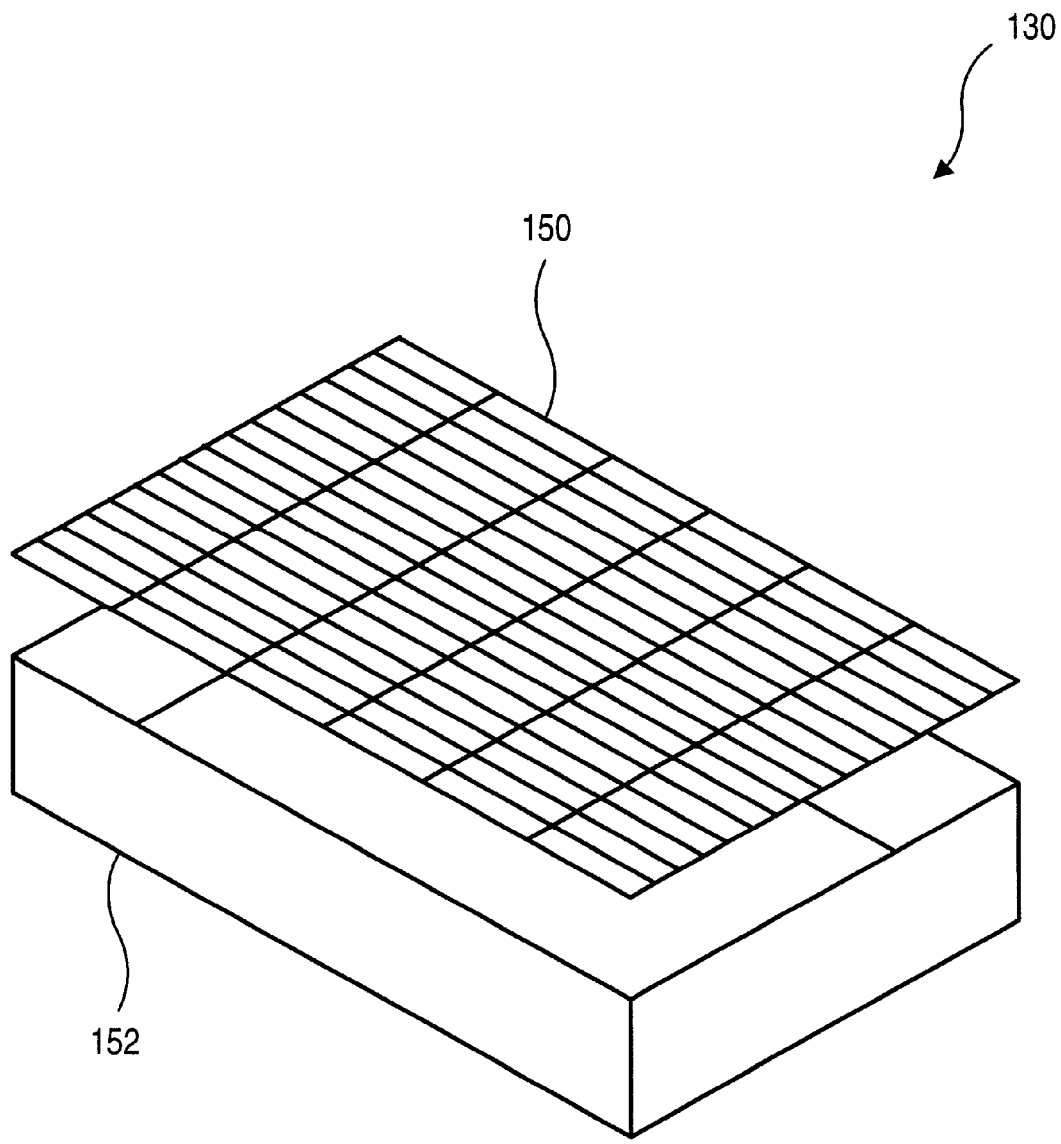
FIG. 8 is an exploded perspective view of a touch screen device which may be used in conjunction with the coin wrapping systems of FIG. 3 or FIG. 7.

FIG. 8 illustrates a touch screen I/O device 130 which may be used in conjunction with the control system 128 of FIG. 3 or FIG. 7. In the illustrated embodiment, the touch screen I/O device 130 comprises a touch screen 150 mounted over a graphics display 152. In one embodiment, the display 152 is a liquid crystal display (LCD) with backlighting. The preferred display has 128 vertical pixels and 256 horizontal pixels. The display 152 contains a built-in character generator which permits the display 152 to display text and numbers having font and size pre-defined by the manufacturer of the display. The system controller 128 (FIG. 3 or FIG. 7) is programmed to permit the loading and display of custom fonts and shapes (e.g., key outlines) on the display 152. The display 152 is commercially available as Part No. GMF24012EBTW from Stanley Electric Company, Ltd., Equipment Export Section, of Tokyo, Japan.

The touch screen 150 is preferably an X-Y matrix touch screen forming a matrix of touch responsive points. In one embodiment, the touch screen 150 includes two closely spaced but normally separated layers of optical grade polyester film each having a set of parallel transparent conductors. The sets of conductors in the two spaced polyester sheets are oriented at right angles to each other so when superimposed they form a grid. Along the outside edge of each polyester layer is a bus which interconnects the conductors supported on that layer. In this manner, electrical signals from the conductors are transmitted to the system controller 128. When pressure from a finger or stylus is applied to the upper polyester layer, the set of conductors mounted to the upper layer is deflected downward into contact with the set of conductors mounted to the lower polyester layer. The contact between these sets of conductors acts as a mechanical closure of a switch element to complete an electrical circuit which is detected by the controller 128 through the respective buses at the edges of the two polyester layers, thereby providing a means for detecting the X and Y coordinates of the switch closure. A matrix touch screen 150 of the above type is commercially available from Dynapro Thin Film Products, Inc. of Milwaukee, Wis.

As illustrated in FIG. 8, the touch screen 150 forms a matrix of ninety-six optically transparent switch elements having six columns and sixteen rows. The system controller 128 (FIG. 3 or FIG. 7) is programmed to divide the switch elements in each column into groups of three to form five switches in each column. Actuation of any one of the three switch elements forming a switch actuates the switch. The uppermost switch element in each column remains on its own and is unused.

Although the touch screen 150 uses an X-Y matrix of optically transparent switches to detect the location of a touch, alternative types of touch screens may be substituted for the touch screen 150. These alternative touch screens use such wellknown techniques as crossed beams of infrared light, acoustic surface waves, capacitance sensing, and resistive membranes to detect the location of a touch. The structure and operation of the alternative touch screens are described and illustrated, for example, in U.S. Pat. Nos. 5,317,140, 5,297,030, 5,231,381, 5,198,976, 5,184,115, 5,105,186, 4,931,782, 4,928,094, 4,851,616, 4,811,004, 4,806,709, and 4,782,328, which are incorporated herein by reference in their entirety.

The system controller 128 is programmed to display various sets of "keys" on the display 152. The "keys" typically include key outlines and legends positioned within the key outlines. If a legend is too lengthy to fit within its associated key outline, the legend is positioned beside the key outline. Each legend designates the function of its associated key. The controller 128 links the functions of the touch screen switches to the keys displayed beneath respective ones of the switches. As a result, pressing the touch screen 150 at a location above a displayed key causes the controller 128 to perform the function associated with that displayed key. The controller 128 indicates that the key has been pressed by illuminating that key. Hereinafter, references to pressing a displayed key denote that an operator is pressing the touch screen 150 at a location above the displayed key.

Figure 9A:
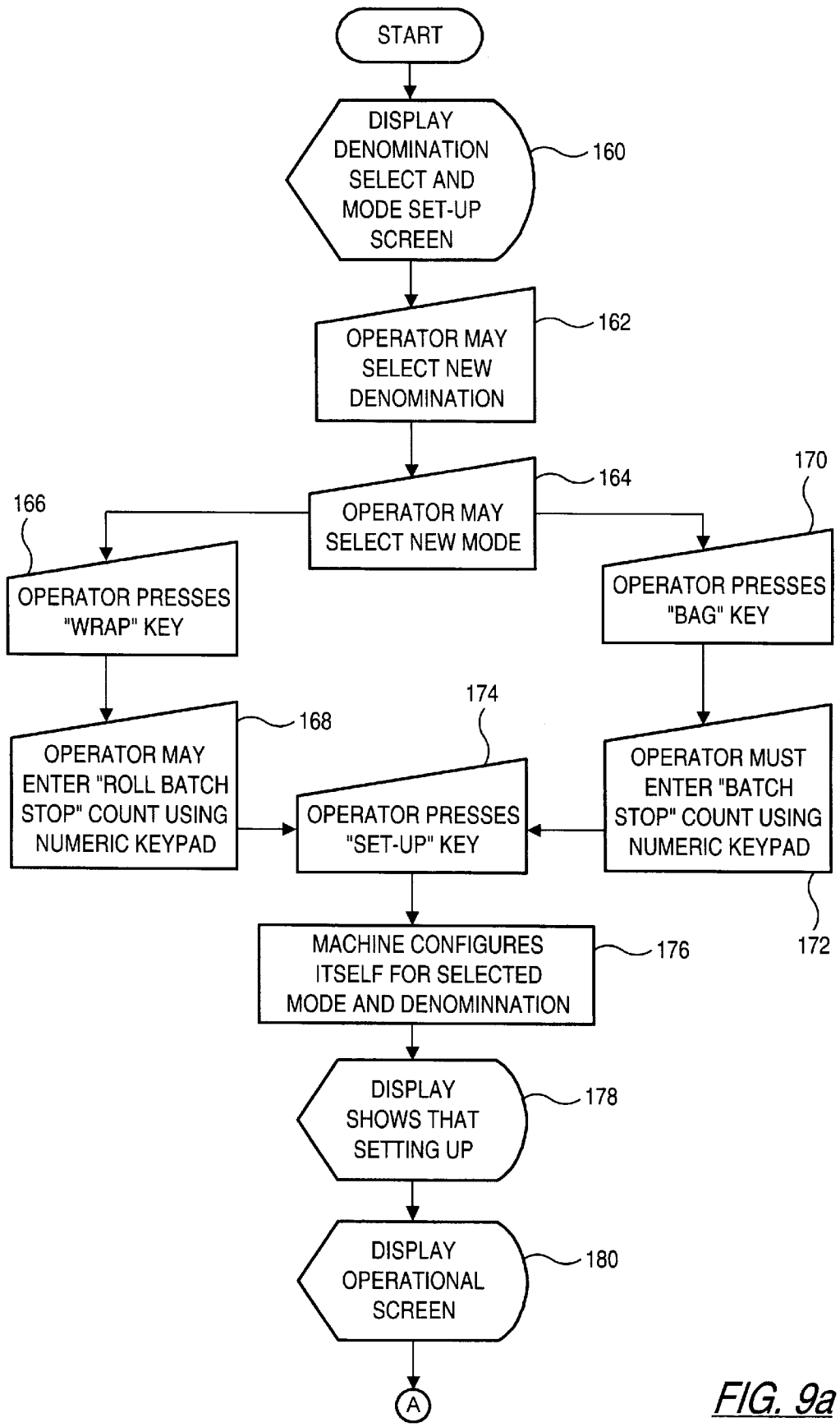
FIGS. 9a–b is a flow diagram showing an interactive process of configuring the coin wrapping system for wrapping or bagging while the controller in FIG. 3
Figure 9B:
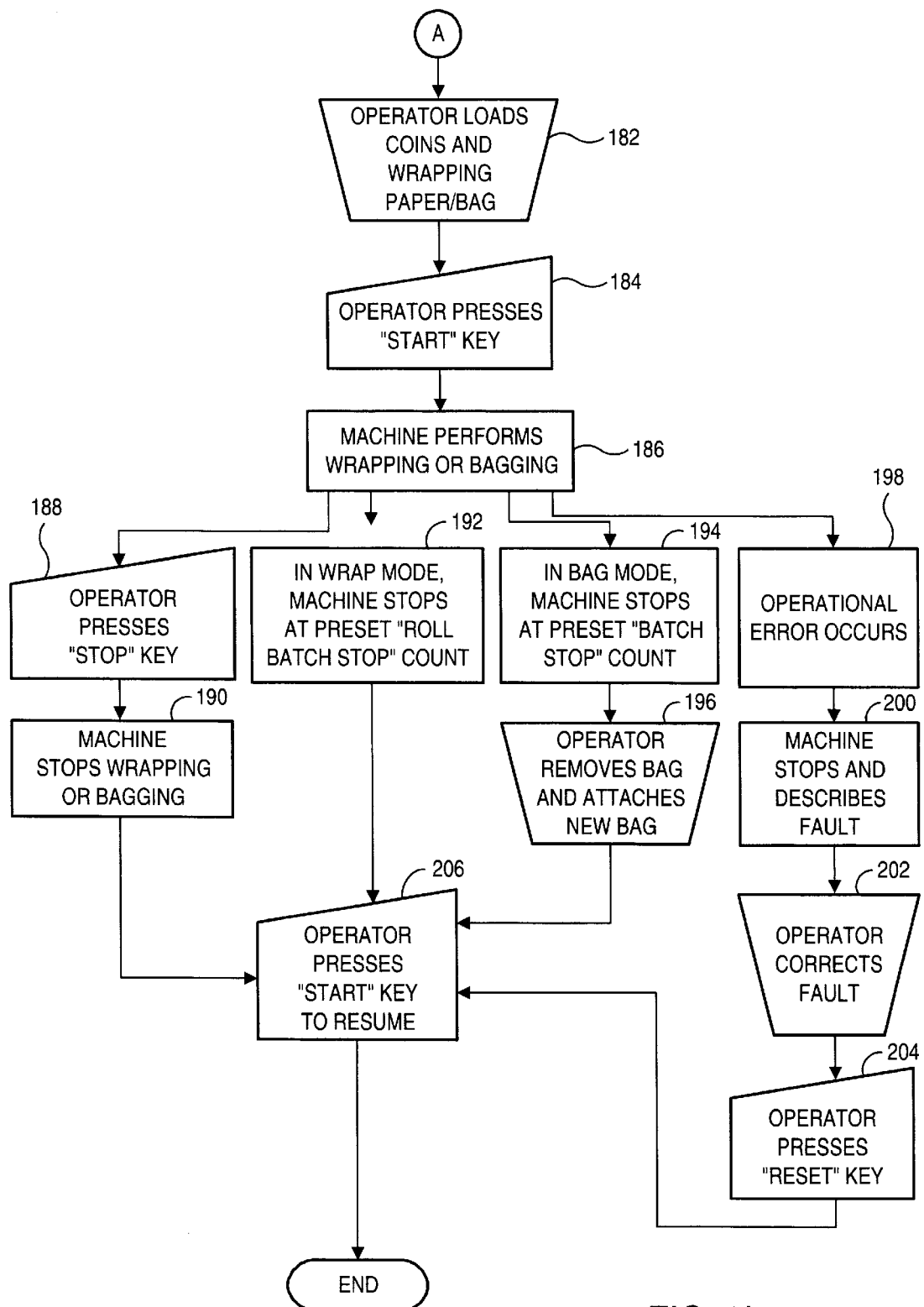

Referring to FIGS. 9a–b, in response to powering up the coin wrapping system, the display 152 displays a denomination select and mode set-up screen (step 160). The denomination select and mode set-up screen is shown in FIG. 12. From the denomination select and mode set-up screen, the operator may select a denomination to be wrapped or bagged (step 162) by pressing the appropriate denomination key. The display 152 shows all available denominations which can be selected by the operator. To maintain the current denomination, the operator simply refrains from pressing a new denomination key different from the current selected denomination. Next, the operator may select either a wrapping or bagging mode, where wrapping is the default mode (step 164). In the bagging mode, coins driven downstream along the coin track described previously are fed directly into a bag chute instead of the aforementioned coin stacker. While the machine is bagging, the bag chute has a bag attached to the exit end thereof to capture coins fed into the bag chute.

To select the wrapping mode, the operator presses the "WRAP" key (step 166). In the wrapping mode, the operator may enter a "roll batch stop" count via the ten-key numeric key pad on the display 152 to automatically stop the machine after the desired number of rolls have been wrapped (step 168). For example, in the denomination select and mode set-up screen shown in FIG. 11, the operator has selected the wrapping mode and set the machine to stop wrapping after 50 rolls.

To select the bagging mode, the operator presses the "BAG" key (step 170). The operator must then enter a "batch stop" count via the numeric key pad on the display 152 (step 172). For example, in the denomination select and mode set-up screen shown in FIG. 14, the operator has selected the bagging mode and set the machine to stop after counting a batch of 1000 coins. Leaving the "batch stop" count blank in the bagging mode causes the controller 128 to generate an alarm message on the display 152 stating that a batch stop is required.

After selecting either the wrapping or bagging mode, the operator presses the "SET-UP" key displayed on the denomination select and mode set-up screen (step 174). In response to pressing the "SET-UP" key, the controller 128 configures the machine for the selected denomination and mode (step 176) and the display 152 shows that the machine is setting itself up (step 178). If, for example, the operator has selected the wrapping mode, the display 152 indicates that the machine is "Setting Up" and requests the operator to "Load Coin and Paper" (see FIG. 11). Similarly, if the operator has selected the bagging mode, the display 152 indicates that the machine is "Setting Up" and requests the operator to "Load Coin and Attach Bag" (see FIG. 14).

After the controller 128 completes the set-up of the machine, the controller 128 displays an operational screen on the display 152 (step 180). In the wrapping mode the operational screen appears substantially as depicted in FIG. 12, and in the bagging mode the operational screen appears substantially as depicted in FIG. 15. During or after the controller 128 completes the set-up of the machine, the operator loads coin and paper for the wrapping mode or loads coin and attaches a bag for the bagging mode (step 182). Next, the operator presses the "START" key to commence wrapping or bagging (steps 184 and 186), and the operational screen displays that the machine is wrapping (FIG. 12) or bagging (FIG. 15).

The machine continues wrapping or bagging until one of the following four events takes place. First, the machine stops wrapping or bagging in response to the operator pressing the "STOP" key (steps 188 and 190). FIG. 13 illustrates the operational screen after the machine has been stopped. Second, if the operator previously entered a "roll batch stop" count in conjunction with the wrapping mode, the machine stops at this preset "roll batch stop" count (step 192). Third, in the bagging mode the machine stops at the preset "batch stop count" (step 194). The operator must then remove the bag filled with the batch and attach a new bag to the machine (step 196). Fourth, in response to an operational error (step 198), the machine stops operation with a message indicating the type and location of the fault (step 200). FIG. 16, for example, describes the occurrence of a coin jam in the coin stacker of the machine. The operator then corrects the fault and presses the "RESET" key to clear the fault (steps 202 and 204). To resume operation following any of the foregoing types of stoppages, the operator presses the "START" key (step 206).

Figure 17:
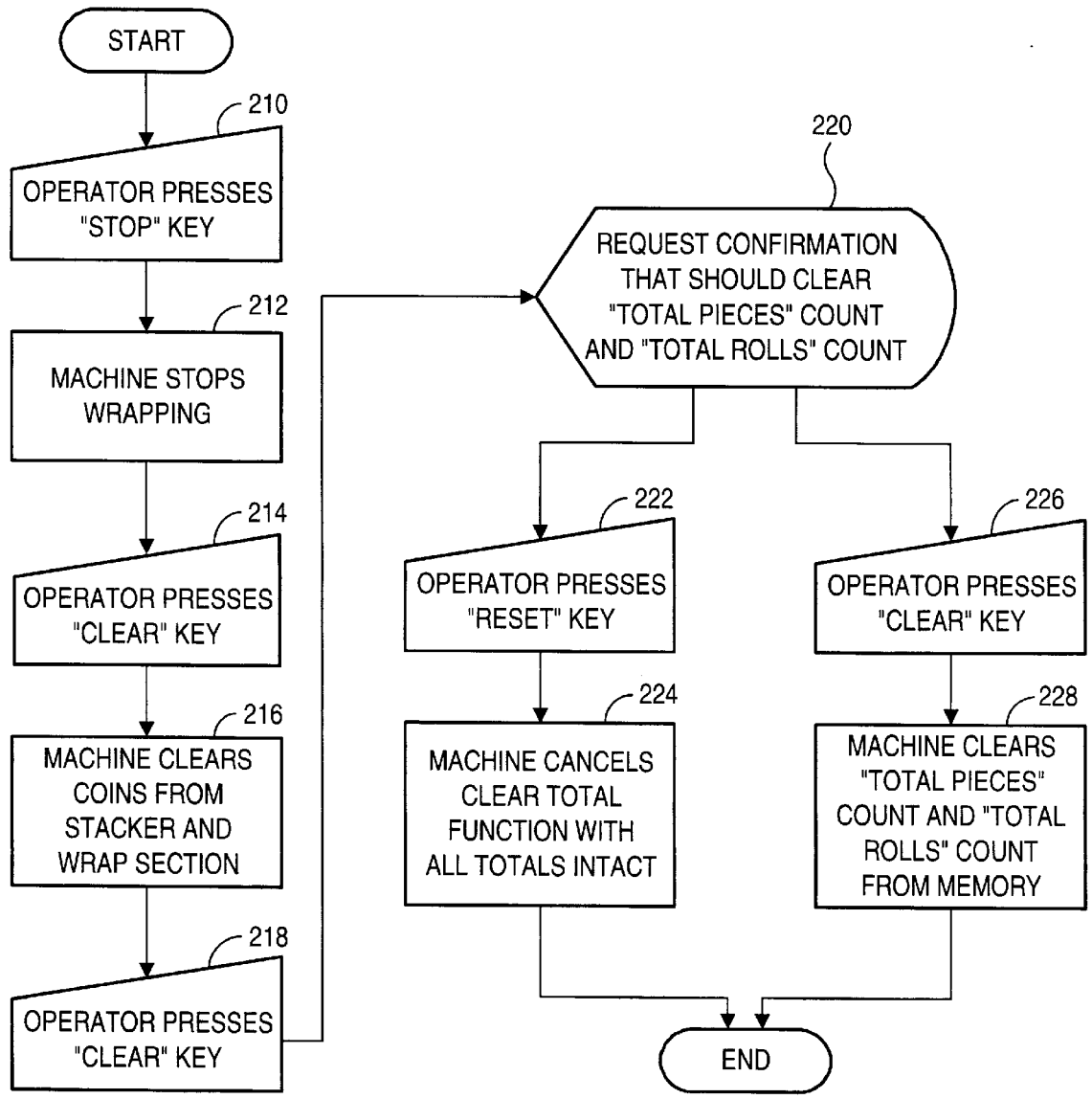
FIG. 17 is a flow diagram showing an interactive process for clearing coins and coin counts from the coin wrapping system while the controller in FIG. 3
Figure 24A:
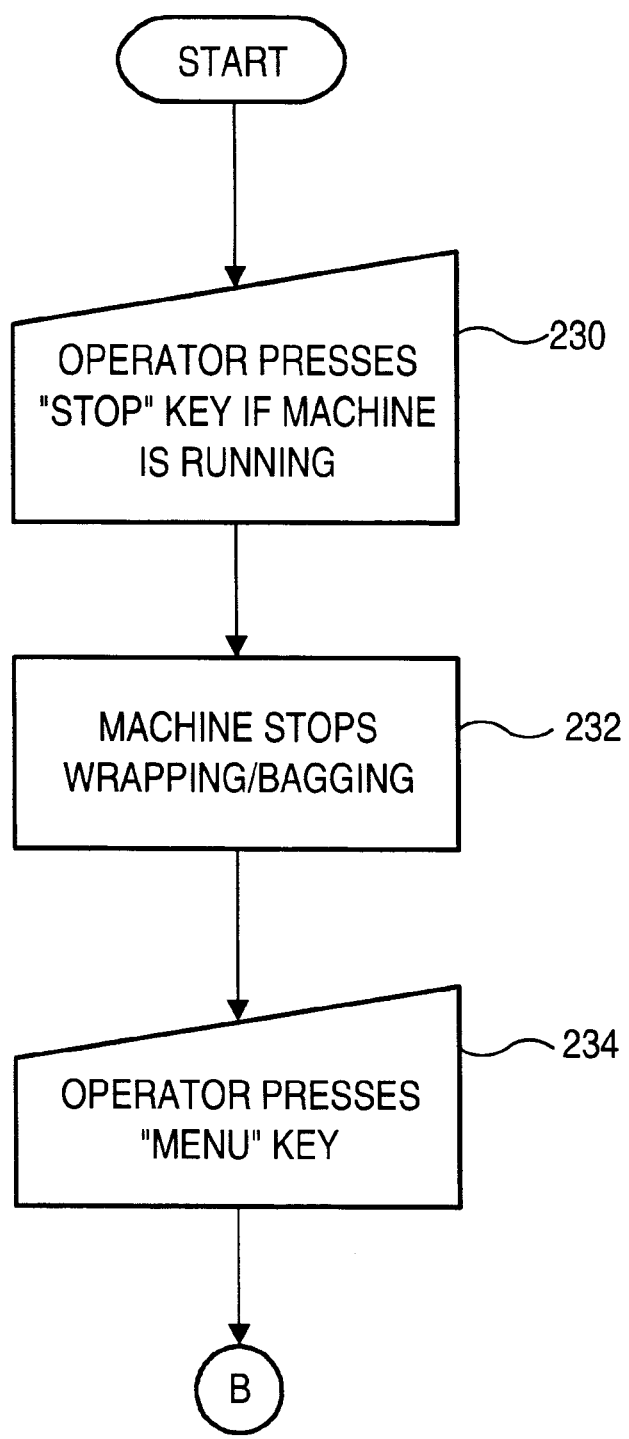
FIGS. 24a–d is a flow diagram showing an interactive process for operating the controller in a memory recall mode, an adjustment for wrap quality mode, a diagnostics mode, and a programming mode.
Figure 24B:
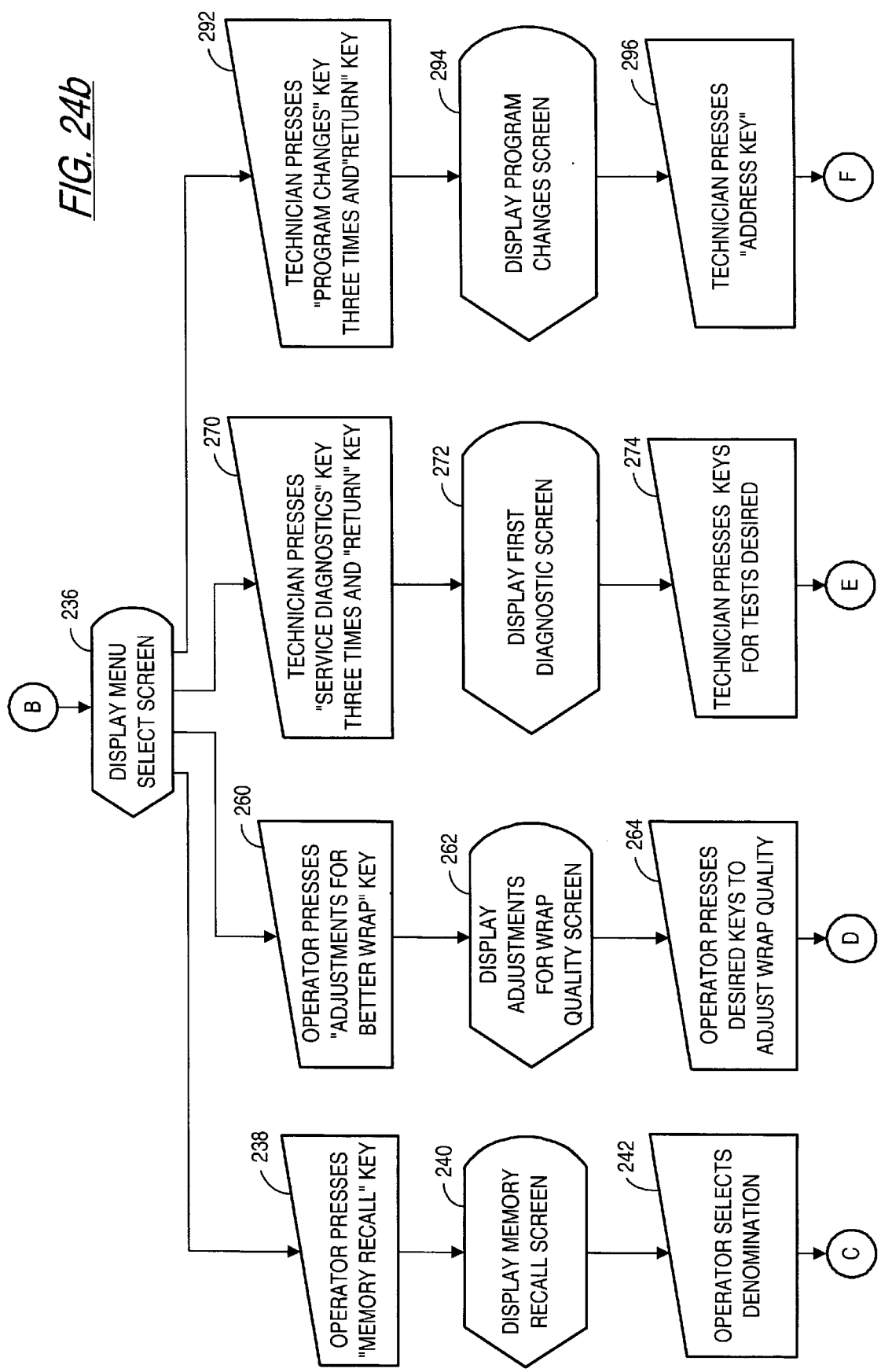
Figure 24C:
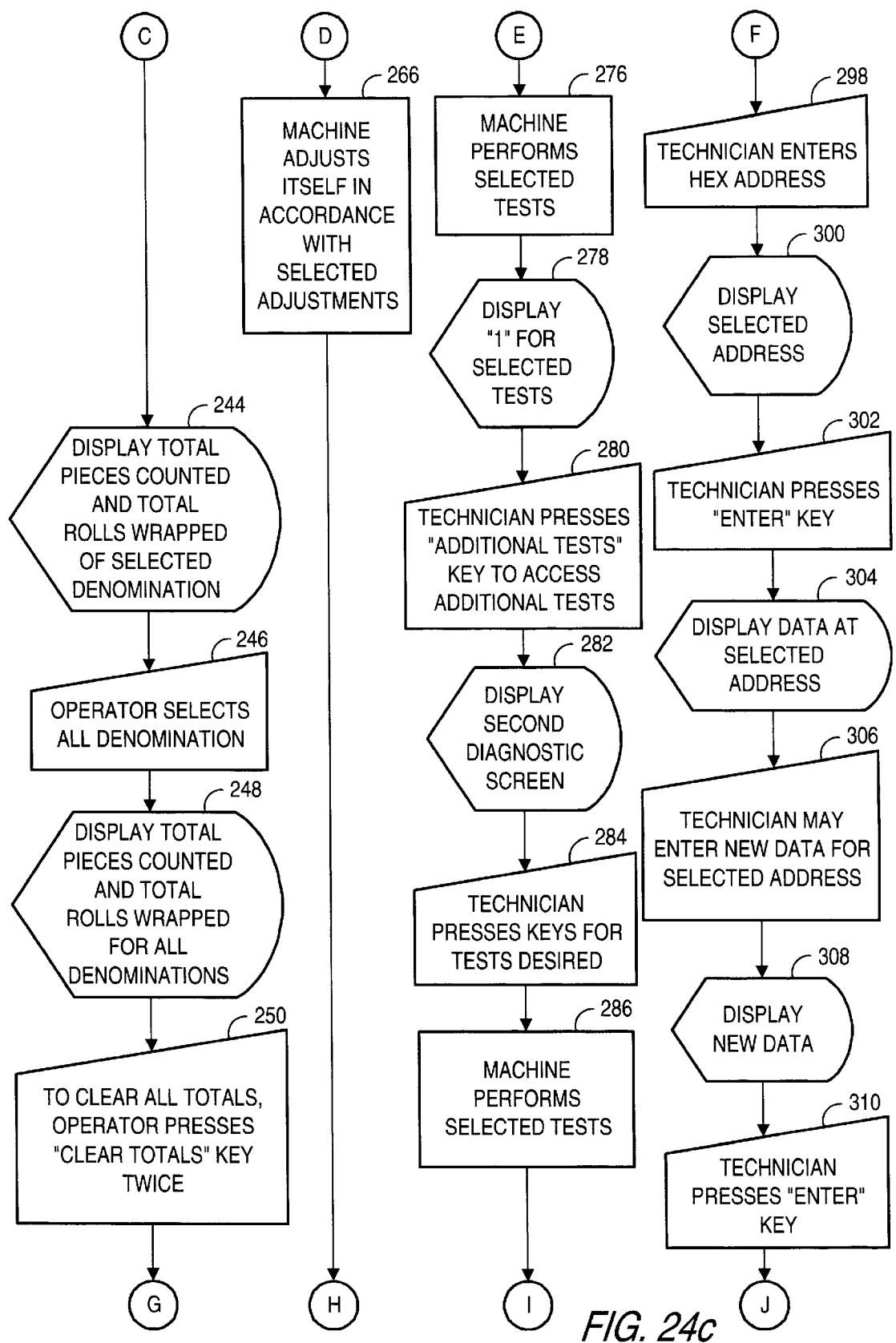
Figure 24D:
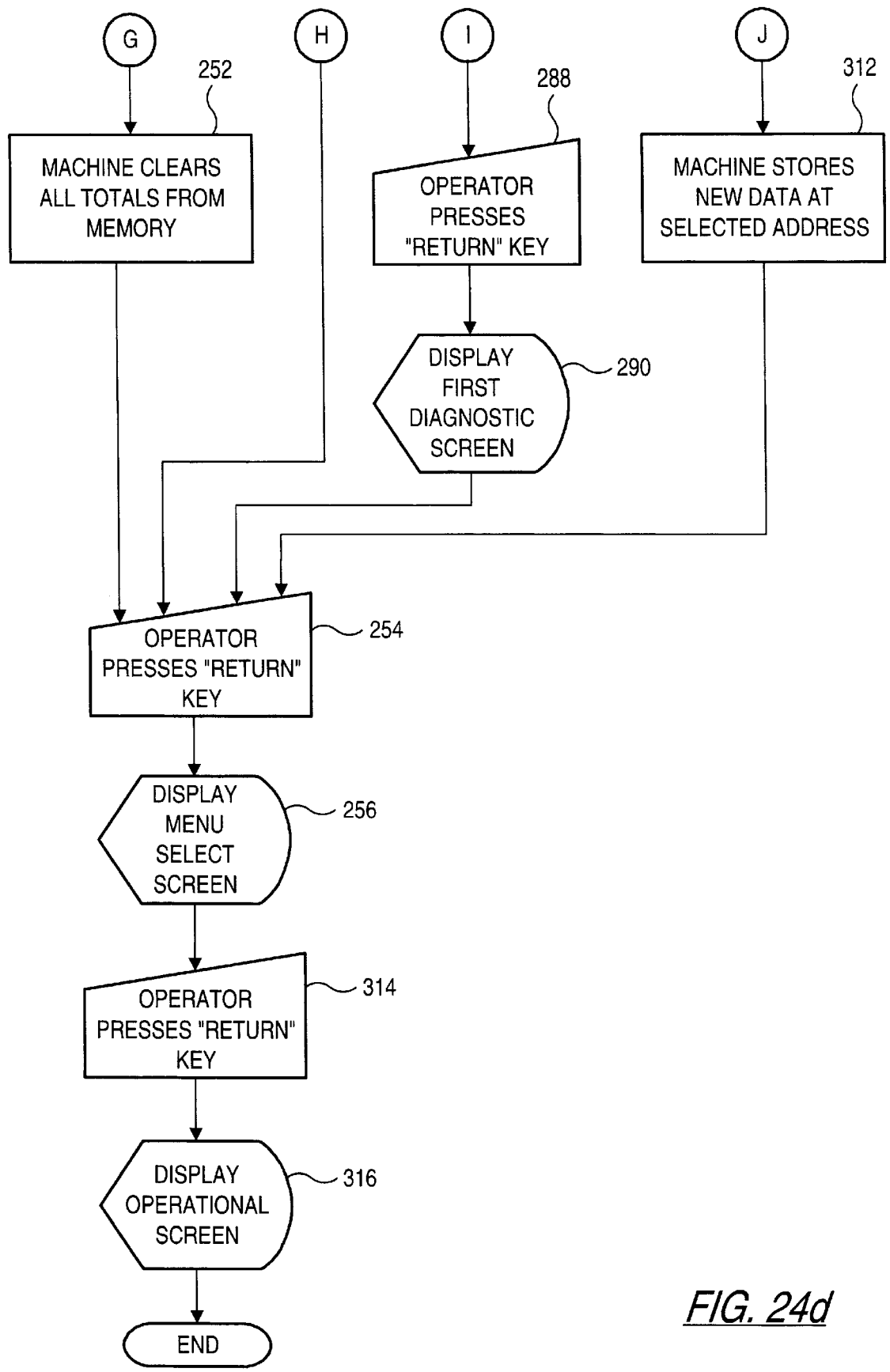

While the coin wrapping mechanism is in the basic operating mode, the operator can clear coins from the stacker and clear coin counts. Referring to FIG. 17, to clear coins from the stacker, the operator first stops the operation of the machine by pressing the "STOP" key on the operational screen (steps 210 and 212). FIG. 18 illustrates the operational screen after the operator has pressed the "STOP" key. Next, the operator presses the "CLEAR" key (step 214). In response to pressing the "CLEAR" key, the machine clears coins from its coin stacker and wrapping sections (step 216). As depicted in FIG. 19, the display 152 indicates that loose coins are being cleared from the machine.

To clear coin counts, such as "total pieces" count and "total rolls" count in the wrapping mode, the operator presses the "CLEAR" key a second time (step 218). This causes the display 152 to request confirmation that the machine should clear the "total pieces" count and "total rolls" count (step 220). As shown in FIG. 20, the display 152 may inquire, "Are you sure? You are clearing totals." At this point, the operator has two options. First, the operator may press the "RESET" key to cause the machine to cancel the clear coin counts function and leave the coin counts intact (steps 222 and 224). As depicted in FIG. 21, the display 152 only indicates that coins have been cleared, not that coin counts have been cleared. Second, the operator may press the "CLEAR" key a third time to cause the machine to clear the "total pieces" count and "total rolls" count from the memory 131 of the controller 128 (steps 226 and 228). As depicted in FIG. 22, the display 152 indicates on the operational screen that coin counts/totals have been cleared.

The operator may wish to maintain a record of the "total pieces" count and "total rolls" count for both a current batch of coins and multiple batches of coins. The "total pieces" count and "total rolls" count on the operational screens in FIGS. 18–23 pertain to the current batch of coins. After processing a batch of coins, these current counts are cleared in the manner described above, i.e., pressing the "CLEAR" key three times in succession. To maintain a cumulative record of the "total pieces" count and "total rolls" count for multiple batches of coins, the operator presses the "ADD" key. Pressing the "ADD" key adds the "total pieces" count and "total rolls" count to locations in the memory 131 dedicated to cumulative totals for the "total pieces" count and "total rolls" count, by denomination and by grand total of all denominations. After the operator presses the "ADD" key, the controller 128 generates a message on the operational screen that the totals have been added to memory (FIG. 23). These cumulative totals for the "total pieces" count and "total rolls" count may be viewed on a memory recall screen described below.

In addition to the basic operating mode, the controller 128 can cooperate with the touch screen 150 and display 152 to operate in a memory recall mode, an adjustment for wrap quality mode, a diagnostics mode, and a programming mode. Referring to FIGS. 24a–d, to enter one of the foregoing four modes, the operator first presses the "STOP" key on the operational screen (step 230) if the machine is running, whether the machine is wrapping (FIG. 12) or bagging (FIG. 15). After the machine stops running (step 232; FIG. 13), the operator presses the "MENU" key on the operational screen to cause the controller 128 to generate the menu select screen shown in FIG. 25 (steps 234 and 236). From the menu select screen, the operator may select either the memory recall mode, adjustment for wrap quality mode, diagnostics mode, or programming mode.

To enter the memory recall mode, the operator presses the "MEMORY RECALL" key on the menu select screen in FIG. 25 (step 238). In response to pressing the "MEMORY RECALL" key, the controller 128 generates the display of the memory recall screen shown in FIG. 26 (step 240). The memory recall screen allows the operator to view "total pieces" counted and "total rolls" wrapped for a particular denomination or for all denominations. To view "total pieces" counted and "total rolls" wrapped for a particular denomination, the operator presses the appropriate denomination key (step 242). Pressing a denomination key causes the display 152 to show "total pieces" counted and "total rolls" wrapped for the selected denomination (step 244; FIG. 26). To view "total pieces" counted and "total rolls" wrapped for all denominations, the operator presses the "ALL DENOMINATIONS" key (step 246). This causes the display 152 to show "total pieces" counted and "total rolls" wrapped for all denominations (step 248; FIG. 27).

If the operator wishes to clear all totals to zero, the operator presses the "CLEAR TOTALS" key twice in succession (step 250). After the first depression, the display 152 requests confirmation from the operator (FIG. 28). Pressing the "CLEAR TOTALS" key a second time clears all totals to zero, causing the display 152 to indicate that all totals are clear (step 252; FIG. 29). Instead of pressing the "CLEAR TOTALS" key a second time, the operator can press the "ALL DENOMINATIONS" key to cancel the clear totals command. Alternatively, the display 152 may be provided with a "CANCEL" key to cancel the clear totals command. To return to the menu select screen from the memory recall screen, the operator presses the "RETURN" key on the memory recall screen (steps 254 and 256).

To enter the adjustment for wrap quality mode, the operator presses the "ADJUSTMENTS FOR BETTER WRAP" key on the menu select screen (step 260; FIG. 22). In response to pressing the "ADJUSTMENTS FOR BETTER WRAP" key, the display 152 shows the adjustments for wrap quality screen illustrated in FIG. 30 (step 262). This screen allows the operator to fine tune mechanical adjustments to accommodate odd sized paper or "over or under" sized coins such as tokens. Any adjustments made by the operator using the adjustments for wrap quality screen apply to the denomination for which the machine has been configured. Therefore, a denomination must be selected on the denomination select and mode set-up screen (FIG. 10) prior to performing adjustments with respect to that denomination. The adjustments for wrap quality screen permits the operator to modify three areas from the default programmed settings: diameter, thickness, and paper feed length.

Since the machine is set up for a particular denomination requiring modification, all the operator needs to do is press the appropriate key to make a change (step 264). For example, to increase the width of the coin track which delivers coins to the coin stacker so as to allow a slightly larger coin to be processed, the operator merely presses the "WIDER" key in FIG. 30. If more wrapping paper needs to be wrapped around a roll of coins, the operator presses the "LONGER" key. The machine adjusts itself in accordance with the selected modifications (step 266), and the display 152 shows the modified settings (FIG. 31). In the preferred embodiment, any adjustments from the default settings are not cleared by any default function. Instead, changes back to the default settings are accomplished by reversing the modified settings. To return to the menu select screen from the adjustments for wrap quality screen, the operator presses the "RETURN" key on the adjustments for wrap quality screen (steps 254 and 256).

To enter the diagnostics mode from the menu select screen (FIG. 25), the operator (e.g., service technician) presses the "SERVICE DIAGNOSTICS" key on she menu select screen three times in rapid succession followed by the "RETURN" key (step 270). In response to pressing the "SERVICE DIAGNOSTICS" key three consecutive times followed by the "RETURN" key, the display 152 shows the diagnostics screen illustrated in FIG. 32 (step 272). The diagnostics screen in FIG. 32 allows the operator to test several functions of the machine, either individually or in combination with one another. In step 274, the operator selects the functions to be tested by pressing the appropriate keys. A "0" on the display 152 converts to a "1" when a switch is activated and is working properly. For example, when adjustment is required for the coin "level sensor", the operator goes into the diagnostics mode to make the adjustment, observing the display 152 for the "1" when the switch is in the correct position. Motors and solenoids are activated by pressing the key for the desired test. The "0" on the diagnostics screen converts to a "1" in response to activating the test (step 278). The technician can activate as many test functions as desired. Once the desired tests are activated, the machine performs the selected tests (step 276).

To access additional tests (step 280), the operator presses the "ADDITIONAL TESTS" key on the diagnostics screen of FIG. 32. In response to pressing the "ADDITIONAL TESTS" key, the display 152 shows the second diagnostic test screen depicted in FIG. 33 (step 282). Using this second diagnostics screen, the operator/technician presses keys associated with desired tests to cause the machine to perform those tests (steps 284 and 286). For example, the "MAIN MOTOR CONT." key allows the operator to test and cycle the main motor 112 (FIG. 3) which drives the elliptical cam 100. Using the "MAIN MOTOR STEPPING" key, the operator can also step the main motor 112 in increments of degrees to check the various positions of the elliptical cam 100 and associated parts driven by the cam 100. Furthermore, the operator can test and adjust as required the servos used to set the width and height of the coin track. The "PLUS" and "MINUS" keys associated with the adjustment keys are used to respectively increase and decrease the dimension. The display 152 will show the dimension in inches and can be converted to metric units. The display 152 will also show the value in Hex units for programming purposes.

To return to the first diagnostic test screen (FIG. 32) from the second diagnostic test screen (FIG. 33), the operator presses the "RETURN" key on the second diagnostic test screen (steps 288 and 290). Thereafter, the operator may press the "RETURN" key on the first diagnostics screen to return the display 152 to the menu select screen (steps 254 and 256).

To enter the programming mode from the menu select screen (FIG. 25), the operator (e.g., service technician) presses the "PROGRAM CHANGES" key on the menu select screen three times in rapid succession followed by the "RETURN" key (step 292). The programming mode is intended only for service personnel. In response to pressing the "PROGRAM CHANGES" key three consecutive times followed by the "RETURN" key, the display 152 shows the program changes screen illustrated in FIG. 34 (step 294). The program changes screen in FIG. 34 allows the operator to make changes to the program running in the memory 131. The programming mode is particularly useful when a customer has a special coin to wrap. The particular measurements and data associated with the special coin can be programmed into the memory 131, thus allowing for customization of the coin wrapping mechanism. Changes to the standard coin set program may also be desired to program the memory 131 with measurements and data associated with mint coins. This feature is particularly useful when a customer handles a large volume of mint coins, because mint coins may have different dimensions relative to circulated coins that can cause problems in wrapping. Tailoring the coin wrapping mechanism to accommodate mint coins eliminates or reduces such wrapping problems.

To initiate a programming change, the operator/technician first presses the "ADDRESS" key in FIG. 34 (step 296). Next, using the alphanumeric keypad on the display 152, the operator enters a hex address (step 298). The hex address is displayed adjacent to the "ADDRESS" key as illustrated in FIG. 35 (step 300). Pressing the "ENTER" key causes the controller 128 to show the data at that hex address in the "CONTENTS" line of the display 152 (steps 302 and 304; FIG. 35). To change the displayed contents of the selected hex address, the technician enters new data using the alphanumeric keypad and presses the "ENTER" key (steps 306, 308 and 310). The controller 128 stores the new data in the memory 131 at the selected hex address (step 312). The operator can change the contents of other hex addresses in similar fashion. The programmed changes thereafter may be copied onto a flashcard and transferred to other machines, in the manner described in relation to FIG. 6. To return to the menu select screen from the program changes screen, the operator presses the "RETURN" key on the program changes screen (steps 254 and 256).

The memory recall mode, adjustment for wrap quality mode, diagnostics mode, and programming mode illustrate the flexibility, versatility, and user friendliness of the touch screen device 130. To return to the operational screen (FIG. 13) from the menu select screen (FIG. 25), the operator presses the "RETURN" key on the menu select screen (steps 314 and 316). This returns the controller 128 to the basic operating mode.

In conjunction with the touch screen device 130, the controller 128 can create a hierarchy of display patterns for display on the display 152. The display patterns may include display fields with textual information, numerical information, data entry prompts, or keys actuated via the touch screen 150. The touch screen device 130 and controller 128 permit a virtually unlimited number of keys to be displayed on the display 152, the number of keys being constrained primarily by the capacity of the memory 131 in the controller 128. Movement from one display pattern to the next may be achieved by pressing a key, such as a "MORE" key or a "BACK" key, displayed on the current display pattern. Such a large number of keys would occupy an inordinate amount of space if formed as part of a mechanical keyboard.

In an alternative embodiment, the controller 128 and touch screen device 130 are used to customize data entry fields, modify (edit) key legends, display key legends and other textual information in different languages, delete (disable) or add (enable) keys or functions displayed on the display 152, and reposition keys displayed on the display 152. In addition, the controller 128 and touch screen device 130 may be employed to modify the complexity of the display patterns on the display 152 to match the level of experience of the operator. For example, a novice may prefer a large number of relatively simple display patterns while a more experienced operator may prefer a small number of relatively complex display patterns. Further information concerning the use of a controller and touch screen device for the aforementioned purposes is described and illustrated in U.S. Pat. No. 5,564,974 entitled "Coin Sorting System With Touch Screen Device", assigned to the assignee of the present invention and incorporated herein by reference in its entirety.

Figure 36:
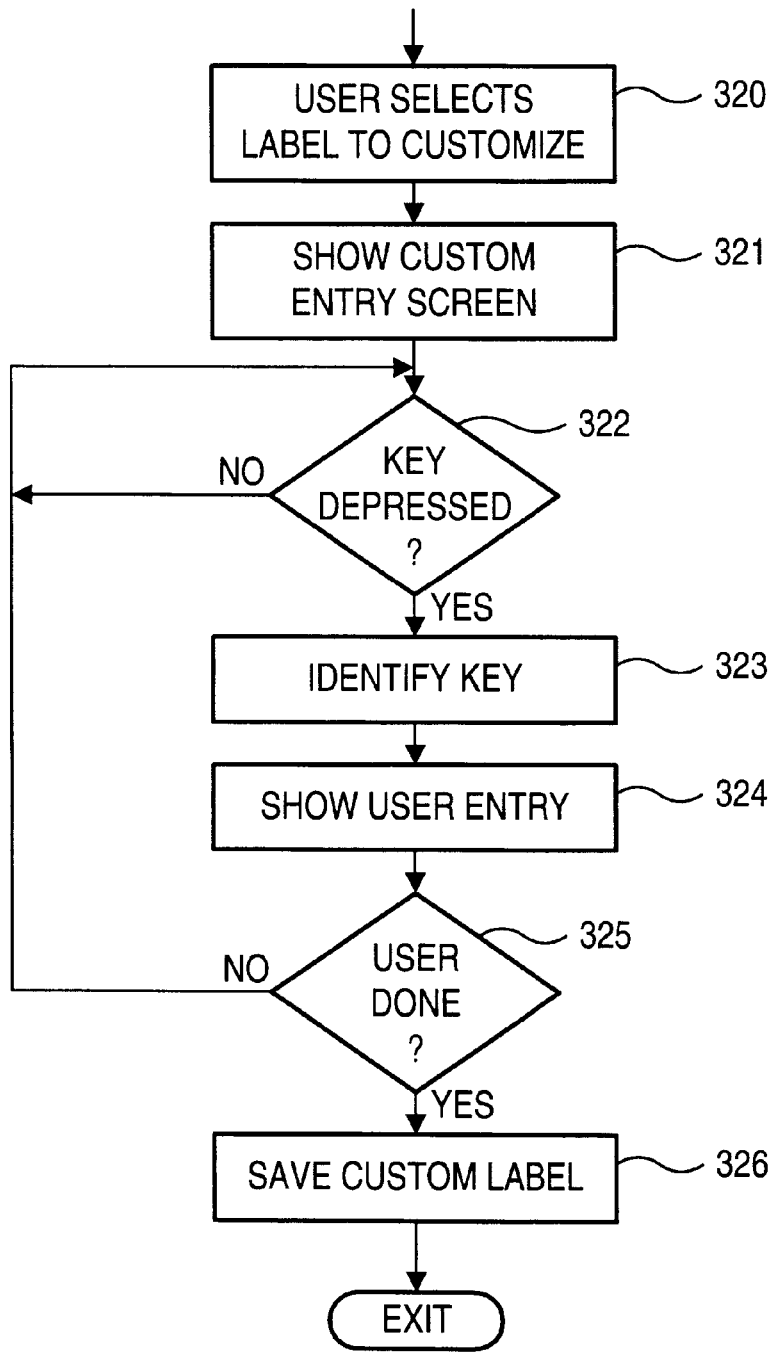
FIG. 36 is a flow diagram showing the operation of providing data entry fields with custom labels in the touch screen device of FIG. 8.

One advantageous feature is that the operator can use the touch screen device 130 to introduce customized labels into the coin wrapping system. For example, the operator may desire to customize the label of a data entry field. Customized labels are typically more meaningful to the operator than the labels encoded in the control software by the manufacturer. A flow diagram illustrating a process of customizing labels is shown in FIG. 36. To provide a field with a customized textual label, the operator first selects a label to customize (step 320). This may be achieved, for example, by pressing a CUSTOM key accompanying a selected data entry field. In response to pressing the CUSTOM key, the controller 128 (FIG. 3 or FIG. 7) causes the display 152 to display a custom entry display pattern including keys for the letters of the alphabet (step 321). The operator then enters a custom label not to exceed a predetermined number of letters and/or numbers (steps 322–325). The controller 128 determines whether a displayed letter key or a mechanical number key is pressed at step 322. If a key is pressed, the controller 128 identifies the pressed key at step 323 and displays the letter or number associated with the pressed key at step 324. When the operator has completed entry of the custom label, the operator signals the controller 128 for example, by pressing an ENTER key on the display 152. Pressing the ENTER key causes the controller 128 to save the custom label (step 326). To return to the main setup menu, the operator may then press an EXIT key on the display 152 until the main setup menu is displayed.

In a manner similar to customizing data entry fields, the operator can use the touch screen device 130 to modify (edit) key legends. The procedure for editing key legends is substantially the same as the procedure for customizing field labels (FIG. 36), except that at step 320 the operator selects the key legend to edit and at step 326 the operator saves the edited key legend. When modifying the key legend, the operator should remember that the function of the key associated with that legend does not change by editing the legend. In other words, the function of the key remains the same regardless of the legend entered for that key.

Figure 37:
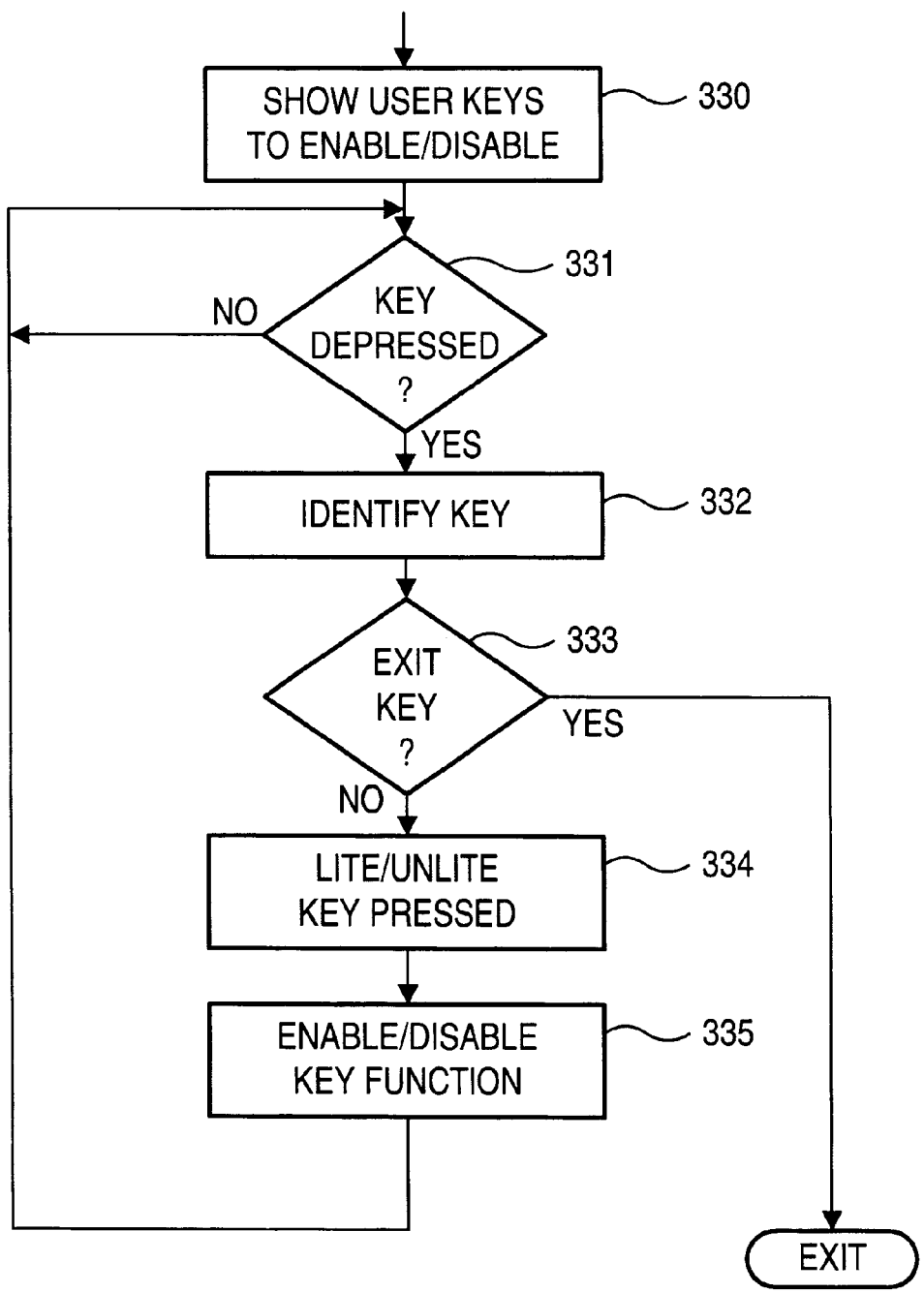
FIG. 37 is a flow diagram showing the operation of enabling and disabling keys in the touch screen device of FIG. 8.

Another advantageous feature of the touch screen device 130 is that the operator can use the touch screen device 130 to delete (disable) or add (enable) keys displayed on the display 152. In one embodiment of the present invention, the controller 128 does not display the disabled keys on the display 152. If, for example, an operator (e.g., a vending company) has no use for a particular coin denomination such as pennies, the operator can delete all references by the display 152 to that coin denomination by disabling the appropriate keys. A flow diagram illustrating a process of adding or deleting keys is shown in FIG. 37. In one embodiment, the operator begins the process by pressing a key, such as "ENABLE KEYS", causing the display 152 to display those keys which may be enabled or disabled (step 330). For example, the current settings of the keys may be determined by whether or not they are illuminated, e.g., with enabled keys illuminated and disabled keys non-illuminated. After showing the operator the keys which may be enabled or disabled (step 330), the controller 128 determines whether a displayed key is pressed at step 331. If a key is pressed, the controller 128 identifies the pressed key at step 332. If the identified key is not the exit key (step 333), the controller 128 disables the pressed key if it was previously enabled and the controller 128 enables the pressed key if it was previously disabled (steps 334 and 335). If at step 333 the controller 128 identifies the pressed key to be the exit key, the controller 128 exits the ENABLE KEYS setup option and returns to the main setup menu.

Figure 38:
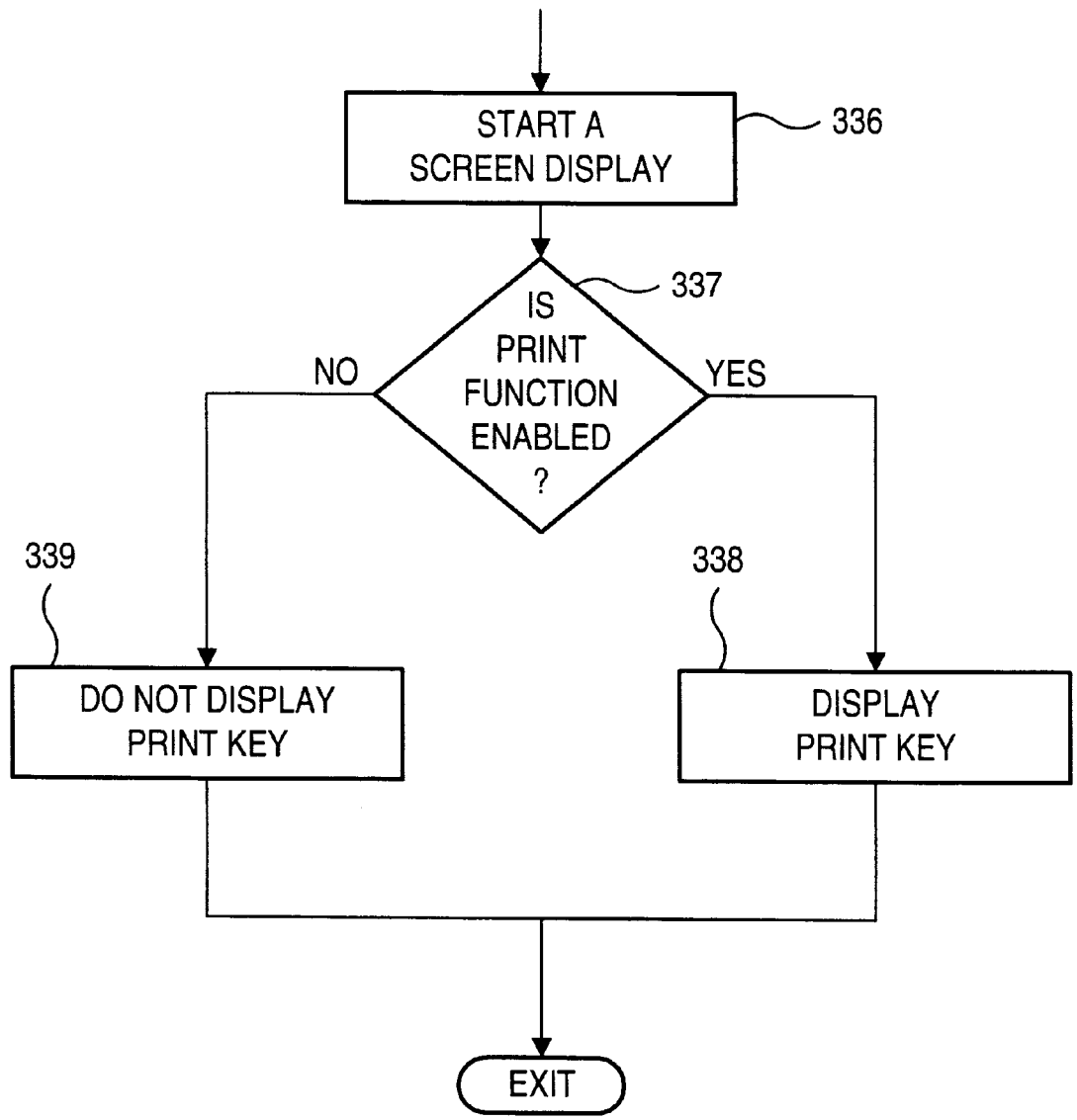
FIG. 38 is a flow diagram showing the operation of enabling and disabling a print key by enabling and disabling the print function in the touch screen device of FIG. 8.

The operator also has the ability to add or delete keys displayed on the display 152 by enabling or disabling the function associated with the keys. This procedure is shown in the flow chart of FIG. 38 in connection with a PRINT key. In one embodiment, the operator begins the process by pressing a key, such as "ENABLE FUNCTIONS", causing the display 152 to display those functions which may be enabled or disabled (step 336). The status of a particular function is indicated by one or more keys located adjacent a textual description of the function. With respect to the print key, the display 152 may display, for example, the word "printer" followed by an OFF key and an ON key. The status of the print key is indicated by which of the two keys is illuminated. If the OFF key is illuminated, the controller 128 does not display the print key in its operating mode (steps 337 and 339). Conversely, if the ON key is illuminated, the controller 128 displays the print key in its operating mode (steps 337 and 338). To return to the main setup menu, the operator may then press an EXIT key on the display 152 until the main setup menu is displayed.

Figure 39:
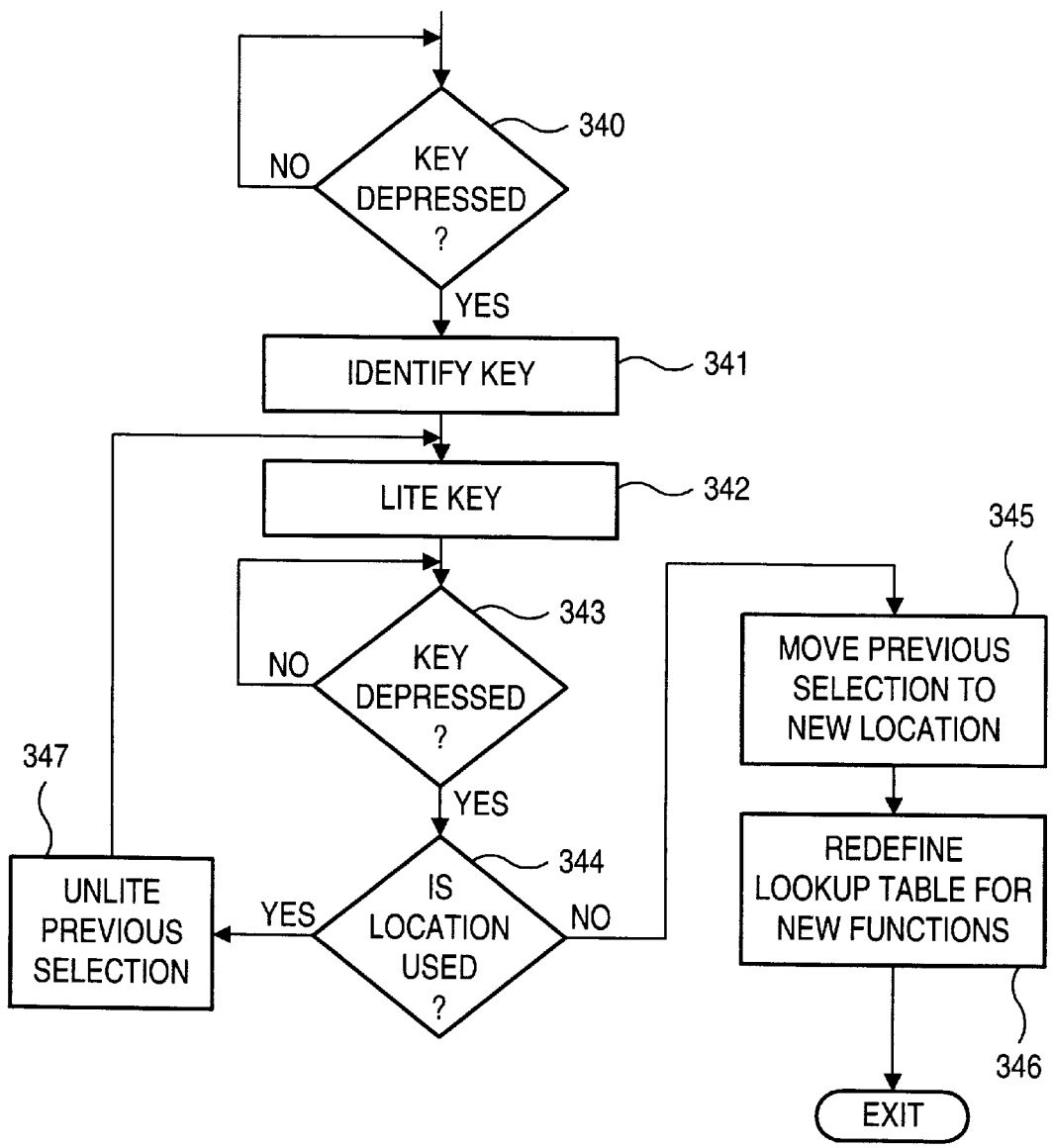
FIG. 39 is a flow diagram showing the operation of repositioning a key displayed on the touch screen device of FIG. 8.

In a manner similar to disabling and enabling keys, the touch screen device 130 may be used to reposition keys displayed on the display 152 in accordance with the preferences of the operator. For example, an operator which repeatedly uses a particular key may wish to position the key on the display 152 at a location which facilitates his/her operation of that key. A flow diagram illustrating one manner of repositioning keys is shown in FIG. 39. In this embodiment, the operator begins the process by pressing a key, such as "REPOSITION KEYS", causing the display 152 to display those keys which may be repositioned. Next, the operator presses a displayed key ("first key") which he/she would like to reposition. The controller 128 determines whether the first key is pressed at step 340. If the first key is pressed, the controller 128 identifies and illuminates the pressed first key (steps 341 and 342). Next, the operator presses a second key located where the operator would like to reposition the first key. The controller 128 determines whether this second key is pressed at step 343. In order to reposition the first key to the location of the second key, the location of the second key must be unused. That is, another function must not already accompany this second key. The controller 128 determines whether the second key is used at step 344. If the second key is unused, the controller 128 repositions the first key to the location of this second key (step 345) and defines the function of this second key to correspond to that of the first key (step 346). If at step 344 the location of the second key is already used, the controller 128 unlights the first key (step 347) and illuminates the second key (step 342). The controller 128 has, in essence, determined that the operator intended to reposition the second key, not the first key, so that the controller 128 waits for the operator to press a third key located where the operator would like to reposition the second key (step 343). As long as this third key is unused (step 344), the controller 128 will move the second key to the location of the third key (step 345) and define the function of the third key to correspond to that of the second key (step 346). In an alternative embodiment, if the operator attempts to reposition a first key to a used second key location, the controller 128 interchanges the first and second keys and their associated functions. The operator returns to the main setup menu by pressing an EXIT key on the display 152.

It should be understood that the controller 128 redefines a look-up table in memory so that the function of a key remains with the key when it is repositioned. In particular, when the key is repositioned from a first location to a second location, the controller 128 redefines the look-up table so that the switch above the second location is now operably connected to the function of the repositioned key and the switch above the first location is no longer operably connected to the function of the repositioned key.

Figure 40:
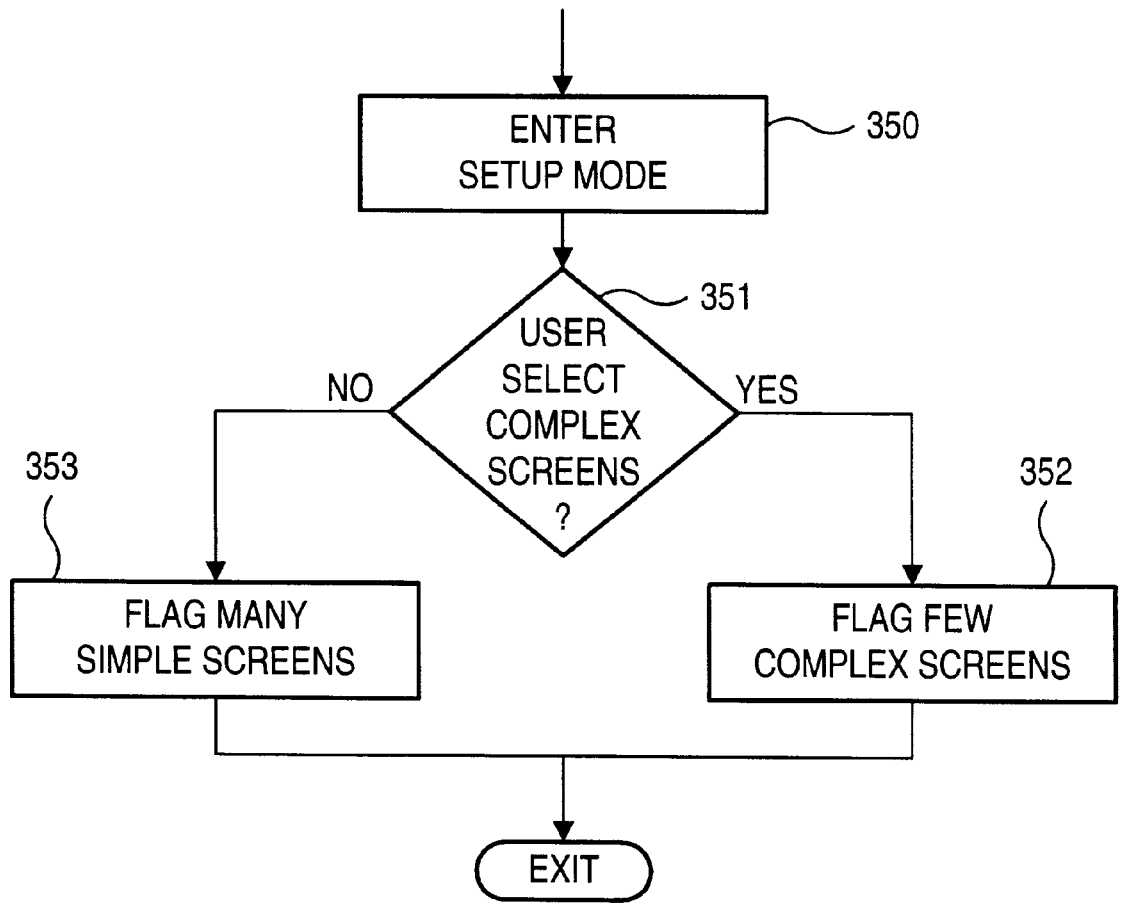
FIG. 40 is a flow diagram showing the operation of selecting the complexity of the display pattern displayed on the touch screen device of FIG. 8.

Yet another advantageous feature of the touch screen device 130 is that the operator can modify the complexity of the display pattern on the display 152 to match the level of experience of the operator. For example, a novice may prefer a large number of relatively simple display patterns while a more experienced operator may prefer a small number of relatively complex display patterns. A flow diagram illustrating one manner of modifying the complexity of the display is shown in FIG. 40. In this embodiment, the operator begins the process by pressing a key, such as "SCREEN COMPLEXITY" (step 350), causing the display 152 to give the operator the option of selecting complex display patterns (step 351). If the operator selects complex display patterns, the controller 128 will provide a relatively small number of complex display patterns in its operating mode (step 352). If the operator does not select complex display patterns, the controller 128 will provide a relatively large number of simple display patterns in its operating mode (step 353). To return to the main setup menu, the operator presses an EXIT key on the display 152.

According to a preferred embodiment of the present invention, the software changes associated with modification of display screens, settings, etc. in any of the operating modes heretofore described (e.g. basic operating mode, memory recall mode, an adjustment for wrap quality mode, a diagnostics mode and programming mode) may be quickly and efficiently copied onto a flash card and thereafter copied onto other machines, in the manner described in relation to FIG. 6. By "cloning" the control software in this manner, an operator may repeatedly obtain the desired customized display screen, setting, etc. of a particular touch screen device 130 or of several different touch screen devices 130 without the need to re-enter several keystrokes. This may be accomplished by initially programming a first coin wrapping machine with the desired parameters, then simply plugging a flash card into the first coin wrapping machine, causing the desired parameters to be copied from the flash memory of the first coin wrapping machine to the flash card. The flash card may then be retained by the operator until it is needed to identically program other coin wrapping machines or to re-program the first machine, at which time the operator simply plugs in the flash card into the coin wrapping machine to be programmed.

In another flash card application, information relating to various types of infrequently-encountered coins or tokens (e.g., information not ordinarily contained within the system memory) may be stored in a flash card memory and periodically communicated to the system memory, thereby permitting the coin wrapping machine to accommodate those coins. For example, the control software in a coin-wrapping machine designated for U.S. markets would ordinarily include information relating to U.S. coins (or perhaps Canadian coins), but would not be able to accommodate British, German or other foreign coins. Nevertheless, the coin sorting machine would be adapted to easily accommodate such foreign coins if equipped with a flash card loading capability, by simply inserting an appropriately programmed flash card into a mating socket in the manner described in relation to FIG. 6, causing the system memory to be rapidly programmed with the foreign coin data on the flash card. In one embodiment of such a system, separate flash cards could be used to store the appropriate settings for coins of separate countries.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A software loading system for a coin wrapping system having a system controller for executing control software associated with the coin sorting system, said software loading system comprising:
   a resident memory containing a first version of control software to be executed by the system controller; and
   a flash card having a flash card memory containing a second version of control software, said flash card being adapted to be removably electrically coupled to the coin wrapping system, said system controller being adapted to execute said second version of control software in response to the flash card being electrically coupled to the coin wrapping system, said system controller being adapted to execute said first version of control software in response to the flash card being thereafter removed from the coin wrapping system.

2. The software loading system of claim 1 wherein said flash card memory comprises a flash memory.

3. The software loading system of claim 1 wherein said coin wrapping system includes a touch screen display for displaying keys associated with operation of the coin wrapping system, said first version of control software including a first display setting of the touch screen display and said second version of control software including a second display setting of the touch screen display.

4. A coin wrapping system, comprising:
   a coin wrapping mechanism for forming a coin stack containing a predetermined number of coins of a preselected denomination and wrapping a wrapping material about said coin stack to form a wrapped roll of coins;
   a system controller coupled to the coin wrapping mechanism;
   display means associated with the system controller for displaying display information associated with operation of the coin wrapping system;
   an operator interface panel coupled to the system controller, the operator interface panel being operable under operator control to customize portions of the display information associated with operation of the coin wrapping system;
   a resident flash memory coupled to the system controller and containing a first set of display information defining a first operation setting of the coin wrapping system; and
   a flash card having a flash card memory containing a second set of display information defining a second operation setting of the coin wrapping system, the flash card being removably electrically coupleable to the system controller, the first set of display information in the resident flash memory being erased and replaced by the second set of display information from the flash card in response to the flash card being electrically coupled to the system controller.

5. The coin wrapping system of claim 4 wherein the display information is selected from the group consisting of textual information, numerical information, and combinations thereof, and wherein the display means includes a display field adapted for displaying the display information.

6. The coin wrapping system of claim 4 wherein the first operation setting includes a first set of data specifying the quality of the wrapped roll of coins and the second operation setting includes a second set of data specifying the quality of the wrapped roll of coins.

7. The coin wrapping system of claim 4 wherein the first operation setting includes a first set of data specifying diagnostic settings associated with operations of the coin wrapping mechanism and the second operation setting includes a second set of data specifying diagnostic settings associated with operations of the coin wrapping mechanism.

8. The coin wrapping system of claim 4 wherein the first operation setting includes a first set of data specifying size and quantity of the coins in the coin stack and the second operation setting includes a second set of data specifying size and quantity of the coins in the coin stack.

9. The coin wrapping system of claim 4 wherein the display means comprises a touch screen display.

10. The coin wrapping system of claim 9 wherein the touch screen display is operable to display a plurality of keys, the first set of display data defining a first configuration of keys eligible for display and the second set of display data defining a second configuration of keys eligible for display.

11. The coin wrapping system of claim 9 wherein the touch screen display is operable to display a plurality of menus, the first set of display data defining a first set of menus eligible for display and the second set of display data defining a second set of menus eligible for display.

12. A method of loading customized display information into a coin wrapping machine including a system controller and a resident flash memory, the resident memory initially containing a first set of display information defining a first operation setting of the coin wrapping machine, said method comprising the steps of:
    storing a customized set of display information in a flash card memory contained within a flash card remote from said coin wrapping machine, the customized information defining a second operation setting of the coin wrapping system; and
    electrically coupling the flash card to the coin wrapping machine, thereby causing the first set of display information in the resident memory to be replaced by the customized set of display information from the flash card.

13. The method of claim 12 wherein the step of storing a customized set of display information in the flash card memory comprises:
    customizing under operator control a set of display information in a source machine, the source machine including a resident flash memory for storing the customized display information; and
    electrically coupling a flash card having a flash card memory to the source machine, thereby causing the customized display information to be copied onto the flash card memory.

14. The method of claim 12 further comprising the step of electrically coupling the flash card to a plurality of additional coin wrapping machines each having a resident memory for storing an initial set of display information, the initial set of display information being replaced by the customized set of display information in each respective one of the coin wrapping machines in response to electrically coupling the flash card to the respective machines.

* * * * *